United States Patent
Mori et al.

(10) Patent No.: US 11,407,870 B2
(45) Date of Patent: Aug. 9, 2022

(54) HARD COAT LAMINATED FILM

(71) Applicant: RIKEN TECHNOS CORPORATION, Tokyo (JP)

(72) Inventors: Masataka Mori, Tokyo (JP); Yasuhiro Itagaki, Tokyo (JP)

(73) Assignee: RIKEN TECHNOS CORPORATION

( * ) Notice: Subject to any disclaimer, the term of this patent is extended or adjusted under 35 U.S.C. 154(b) by 763 days.

(21) Appl. No.: 16/332,573

(22) PCT Filed: Jul. 27, 2017

(86) PCT No.: PCT/JP2017/027297
§ 371 (c)(1),
(2) Date: Mar. 12, 2019

(87) PCT Pub. No.: WO2018/051653
PCT Pub. Date: Mar. 22, 2018

(65) Prior Publication Data
US 2020/0247973 A1    Aug. 6, 2020

(30) Foreign Application Priority Data
Sep. 14, 2016 (JP) .............................. JP2016-179105

(51) Int. Cl.
*C08J 7/04* (2020.01)
*G02B 1/14* (2015.01)
(Continued)

(52) U.S. Cl.
CPC .............. *C08J 7/042* (2013.01); *C08J 7/046* (2020.01); *C08K 3/013* (2018.01); *C08K 5/37* (2013.01);
(Continued)

(58) Field of Classification Search
CPC .................... G02B 1/14; G02B 1/11–1/118
See application file for complete search history.

(56) References Cited

U.S. PATENT DOCUMENTS 3,496,143 A    2/1970 Siggel et al.
6,055,823 A    5/2000 Baker et al.
(Continued)

FOREIGN PATENT DOCUMENTS

CN    1649733 A    8/2005
CN    102686642 A    9/2012
(Continued)

OTHER PUBLICATIONS

Machine translation of JP2010-131771. Retrieved Feb. 3, 2022.*
(Continued)

*Primary Examiner* — Prashant J Khatri
(74) *Attorney, Agent, or Firm* — Bracewell LLP; Brad Y. Chin

(57) ABSTRACT

Embodiments relate to a hard coat laminated film having a first hard coat, a second hard coat, and a transparent resin film layer, where: the first hard coat is formed from paint which contains predetermined amounts of (A) a multifunctional (meth)acrylate, (B) a water repellent, and (C) a silane coupling agent, and which does not contain inorganic particles; and the second hard coat is formed from paint containing predetermined amounts of (D) a polymerizable compound and (E) inorganic fine particles having an average particle size of 1-300 nm. The (D) polymerizable compound contains: (d1) a multifunctional (meth)acrylate having three or more (meth)acryloyl groups in one molecule; (d2) a compound having two or more secondary thiol groups in one molecule; and optionally, (d3) at least one (meth)acrylate selected from the group consisting of a (meth)acrylate having two (meth)acryloyl groups in one molecule, a (meth) acrylate having one (meth)acryloyl group in one molecule, and a urethane(meth)acrylate.

20 Claims, 2 Drawing Sheets

(51) Int. Cl.
  *C08K 3/013*  (2018.01)
  *C08J 7/046*  (2020.01)
  *C08K 5/37*  (2006.01)
  *C08K 5/544*  (2006.01)

(52) U.S. Cl.
  CPC .......... *G02B 1/14* (2015.01); *C08J 2333/08* (2013.01); *C08J 2333/10* (2013.01); *C08J 2333/26* (2013.01); *C08J 2347/00* (2013.01); *C08J 2371/00* (2013.01); *C08J 2375/04* (2013.01); *C08K 5/544* (2013.01); *C08K 2201/005* (2013.01)

(56) References Cited

U.S. PATENT DOCUMENTS

| | | |
|---|---|---|
| 6,489,015 B1 | 12/2002 | Tsuchiya et al. |
| 10,596,739 B2 | 3/2020 | Washio et al. |
| 10,780,685 B2 | 9/2020 | Mori et al. |
| 2003/0022984 A1 | 1/2003 | Kawase et al. |
| 2003/0022987 A1 | 1/2003 | Kawase et al. |
| 2005/0249942 A1 | 11/2005 | Coggio et al. |
| 2006/0134400 A1 | 6/2006 | Takada et al. |
| 2006/0210727 A1 | 9/2006 | Ibuki et al. |
| 2007/0291363 A1 | 12/2007 | Asakura et al. |
| 2008/0280086 A1 | 11/2008 | Sheridan et al. |
| 2010/0104879 A1* | 4/2010 | Okano .................. B32B 25/08 428/447 |
| 2010/0147191 A1 | 6/2010 | Sakano et al. |
| 2010/0210812 A1 | 8/2010 | Urakawa et al. |
| 2011/0279024 A1 | 11/2011 | Hiyama et al. |
| 2012/0114892 A1 | 5/2012 | Jung et al. |
| 2013/0059158 A1 | 3/2013 | Oguro et al. |
| 2013/0063393 A1 | 3/2013 | Kurishima et al. |
| 2013/0084458 A1 | 4/2013 | Yamada et al. |
| 2013/0216801 A1 | 8/2013 | Kadoki et al. |
| 2013/0222906 A1 | 8/2013 | Tsunekawa et al. |
| 2014/0044891 A1 | 2/2014 | Shibata et al. |
| 2014/0208657 A1 | 7/2014 | Kim et al. |
| 2014/0227482 A1 | 8/2014 | Shibata et al. |
| 2014/0360975 A1 | 12/2014 | Hustad et al. |
| 2015/0197662 A1 | 7/2015 | Kang et al. |
| 2015/0203711 A1 | 7/2015 | Kang et al. |
| 2016/0122525 A1 | 5/2016 | Carloff et al. |
| 2016/0122573 A1 | 5/2016 | Uprety et al. |
| 2016/0214294 A1 | 7/2016 | Tsujimura et al. |
| 2016/0229159 A1 | 8/2016 | Nakashima et al. |
| 2017/0095993 A1 | 4/2017 | Tomomatsu et al. |
| 2017/0183543 A1 | 6/2017 | Nagata et al. |
| 2017/0198164 A1 | 7/2017 | Itagaki et al. |
| 2018/0072029 A1 | 3/2018 | Nakashima et al. |

FOREIGN PATENT DOCUMENTS

| | | |
|---|---|---|
| CN | 103492913 A | 1/2014 |
| CN | 104422239 A | 3/2015 |
| CN | 105404094 A | 3/2016 |
| EP | 2873692 A1 | 5/2015 |
| JP | S633011 A | 1/1988 |
| JP | H0211665 A | 1/1990 |
| JP | H0794061 A | 4/1995 |
| JP | 2000052472 A | 2/2000 |
| JP | 2000190430 A | 7/2000 |
| JP | 2000214791 A | 8/2000 |
| JP | 2000517455 A | 12/2000 |
| JP | 2002062405 A | 2/2002 |
| JP | 2004109966 A | 4/2004 |
| JP | 2005148444 A | 6/2005 |
| JP | 2005181940 A | 7/2005 |
| JP | 2006030983 A | 2/2006 |
| JP | 2006058574 A | 3/2006 |
| JP | 2006154758 A | 6/2006 |
| JP | 2006215488 A | 8/2006 |
| JP | 2007025040 A | 2/2007 |
| JP | 2007108449 A | 4/2007 |
| JP | 2007537059 A | 12/2007 |
| JP | 2008026883 A | 2/2008 |
| JP | 2008095064 A | 4/2008 |
| JP | 2008201864 A | 9/2008 |
| JP | 2008538195 A | 10/2008 |
| JP | 2009036818 A | 2/2009 |
| JP | 2009114248 A | 5/2009 |
| JP | 2009196125 A | 9/2009 |
| JP | 2009255544 A | 11/2009 |
| JP | 2009279806 A | 12/2009 |
| JP | 2010064332 A | 2/2010 |
| JP | 2010054861 A | 3/2010 |
| JP | 2010060190 A | 3/2010 |
| JP | 2010064332 A | 3/2010 |
| JP | 2010078642 A | 4/2010 |
| JP | 2010511206 A | 4/2010 |
| JP | 2010107823 A | 5/2010 |
| JP | 2010131771 A | 6/2010 |
| JP | 2010208035 A | 9/2010 |
| JP | 2010211150 A | 9/2010 |
| JP | 2010224150 A | 10/2010 |
| JP | 2010241019 A | 10/2010 |
| JP | 2010271400 A | 12/2010 |
| JP | 2010275385 A | 12/2010 |
| JP | 2011032350 A | 2/2011 |
| JP | 2011037927 A | 2/2011 |
| JP | 2011512422 A | 4/2011 |
| JP | 2011128439 A | 6/2011 |
| JP | 2011133862 A | 7/2011 |
| JP | 2011175040 A | 9/2011 |
| JP | 2011201087 A | 10/2011 |
| JP | 2011213989 A | 10/2011 |
| JP | 2012062385 A | 3/2012 |
| JP | 2012111943 A | 6/2012 |
| JP | 2012234163 A | 11/2012 |
| JP | 2012250438 A | 12/2012 |
| JP | 2013075466 A | 4/2013 |
| JP | 2013076029 A | 4/2013 |
| JP | 2013142113 A | 7/2013 |
| JP | 2013173871 A | 9/2013 |
| JP | 201431397 A | 2/2014 |
| JP | 2014024332 A | 2/2014 |
| JP | 2014025061 A | 2/2014 |
| JP | 2014080536 A | 5/2014 |
| JP | 2014117904 A | 6/2014 |
| JP | 2014143831 A | 8/2014 |
| JP | 2014152237 A | 8/2014 |
| JP | 2014152281 A | 8/2014 |
| JP | 2014201681 A | 10/2014 |
| JP | 2014238614 A | 12/2014 |
| JP | 2014240955 A | 12/2014 |
| JP | 2015013472 A | 1/2015 |
| JP | 2015013473 A | 1/2015 |
| JP | 2015016683 A | 1/2015 |
| JP | 2015033851 A | 2/2015 |
| JP | 2015034285 A | 2/2015 |
| JP | 2015034286 A | 2/2015 |
| JP | 2015083370 A | 4/2015 |
| JP | 2015151420 A | 8/2015 |
| JP | 2015182272 A | 10/2015 |
| JP | 2015182273 A | 10/2015 |
| JP | 2015184639 A | 10/2015 |
| JP | 2015203770 A | 11/2015 |
| JP | 2016006160 A | 1/2016 |
| JP | 2016011365 A | 1/2016 |
| JP | 5870222 B1 | 2/2016 |
| JP | 5878255 B1 | 3/2016 |
| JP | 2016060839 A | 4/2016 |
| JP | 2016172423 A | 9/2016 |
| JP | 2016172424 A | 9/2016 |
| JP | 2016177260 A | 10/2016 |
| JP | 2015098495 A1 | 3/2017 |
| JP | 2017200042 A | 11/2017 |
| KR | 1020040094153 A | 11/2001 |
| KR | 20040094153 A | 11/2004 |
| KR | 20100129512 A | 12/2010 |
| KR | 20140056399 A | 5/2014 |
| KR | 10-2013-0058565 A | 12/2014 |
| TW | 200609110 A | 3/2006 |

(56) References Cited

FOREIGN PATENT DOCUMENTS

| TW | 201300236 A | 1/2013 | |
|---|---|---|---|
| TW | 201420652 A | 6/2014 | |
| TW | 201437304 A | 10/2014 | |
| TW | 201504320 A | 2/2015 | |
| TW | 201602268 A | 1/2016 | |
| TW | 201638250 A | 11/2016 | |
| WO | 2005113690 A2 | 12/2005 | |
| WO | 2006102383 A1 | 9/2006 | |
| WO | 2008029766 A1 | 3/2008 | |
| WO | 2008067262 A1 | 6/2008 | |
| WO | 2011033976 A1 | 3/2011 | |
| WO | 2011034847 A1 | 3/2011 | |
| WO | 2011145630 A1 | 11/2011 | |
| WO | 2012026446 A1 | 3/2012 | |
| WO | 2012144508 A1 | 10/2012 | |
| WO | 2012144510 A1 | 10/2012 | |
| WO | 2013129531 A1 | 9/2013 | |
| WO | 2014030848 A1 | 2/2014 | |
| WO | 2014203792 A1 | 12/2014 | |
| WO | 2015001948 A1 | 1/2015 | |
| WO | 2015005049 A1 | 1/2015 | |
| WO | 2015045823 A1 | 4/2015 | |
| WO | 2015098495 A1 | 7/2015 | |
| WO | 2015146565 A | 10/2015 | |
| WO | WO-2015150244 A1 * | 10/2015 | ............ C08K 3/013 |
| WO | 2015171340 A1 | 11/2015 | |
| WO | 2015182253 A1 | 12/2015 | |
| WO | 2016147424 A1 | 9/2016 | |
| WO | 2016147733 A1 | 9/2016 | |
| WO | 2016147734 A1 | 9/2016 | |
| WO | 2016147739 A1 | 9/2016 | |
| WO | 2016147776 A1 | 9/2016 | |
| WO | 2017200042 A | 11/2017 | |

OTHER PUBLICATIONS

CN201910756415.4 First Office Action dated Dec. 31, 2020, 9 pgs.
CN201680015902.X Office Action dated Jan. 2, 2020, 16 pgs.
KR10-2019-7014887 First Office Action dated Oct. 22, 2021, 11 pgs.
EP15885519.7 Third Party Observations dated Jan. 8, 2020, 85 pgs.
EP16872835.0 Extended European Search Report dated July 8, 2019; 6 pgs.
CN201780055888.0 First Office Action dated Jul. 2, 2020, 11 pgs.
KR10-2019-7010129 First Office Action dated Jun. 25, 2021, 10 pgs.
JP2016-29588 Office Action dated Dec. 24, 2019, 7 pgs.
EP20150365.3 Extended European Search Report dated Apr. 9, 2020, 8 pgs.
CN201910746657.5 First Office Action dated Oct. 27, 2020, 18 pgs.
TW105104907 Office Action dated Oct. 18, 2019; 10 pages.
JP6599789B Notice for Reasons for Revocation dated Sep. 29, 2020, 32 pgs.
CN201680015902.X Second Office Action dated Jul. 17, 2019; 16 pgs.
CN201780069802.X Second Office Action dated Nov. 25, 2020, 23 pgs.
PCT/JP2017/027297 International Search Report dated Aug. 29, 2017; 2 pgs.
JP2017-152119 Office Action dated Aug. 7, 2018; 10 pgs.
EP16868622.8 Extended European Search Report dated May 20, 2019; 8 pgs.
JP2017-094366 Office Action dated Jan. 26, 2021, 18 pgs.
TW106125432 First Office Action dated Dec. 28, 2020, 14 pgs.
PCT/JP2016/052927 International Search Report dated Apr. 19, 2016; 2 pgs.
CN201580003516.4 Office Action dated Jan. 17, 2018; 20 pgs.
CN20160015900.0 Office Action dated Nov. 5, 2018; 12 pgs.
CN201680015850.6 Office Action dated Jan. 24, 2019; 10 pgs.
PCT/JP2016/053357 International Search Report dated May 17, 2016; 2 pgs.
CN201680015901.5 Office Action dated Jan. 28, 2019; 12 pgs.
CN201680015902.X Office Action dated Feb. 3, 2019; 15 pgs.
CN201680015908.7 Office Action dated Feb. 2, 2019; 12 pgs.
PCT/JP2016/053355 International Search Report dated May 17, 2016; 2 pgs.
CN201680015984.8 Office Action dated Nov. 5, 2018; 13 pgs.
EP15885519.7 Extended European Search Report dated Oct. 18, 2018; 8PGS.
PCT/JP2016/053556 International Search Report dated May 17, 2016; 2 pgs.
EP16764550.6 Extended European Search Report dated Oct. 18, 2018; 8 pgs.
EP16764564.7 Extended European Search Report dated Oct. 18, 2018; 8 pgs.
EP16764565.4 Extended European Search Report dated Oct. 18, 2018; 8 pgs.
PCT/JP2016/054363 International Search Report dated May 17, 2016; 2 pgs.
EP16764570.4 Search Report dated May 28, 2018; 8 pgs.
CN201580003516.4 Office Action dated Jun. 28, 2017; 22 pgs.
JP2017069555 Office Action dated Nov. 27, 2018; 8 pgs.
JP6144330 Opposition Paper dated Dec. 5, 2017; 45 Pgs.
KR10-2016-7017502 Decision of Rejection dated May 10, 2018; 8 pgs.
KR10-2016-7017502 Office Action dated Oct. 27, 2017; 18pgs.
KR10-2017-7026048 Korean Office Action dated Nov. 1, 2018; 14 pgs.
KR10-2019-7001505 Office Action dated Feb. 20, 2019; 12 pgs.
Lai, et al., Synthetic Process and Application of Silicone Products, 2nd Edition, Nov. 2009, 4 pgs.
PCT/JP2016/084794 International Search Report dated Jan. 25, 2017; 2 pgs.
PCT/JP2016/084981 International Preliminary Report on Patentability dated Jun. 21, 2018; 13 pgs.
PCT/JP2016/084981 International Search Report dated Jan. 25, 2017; 2 pgs.
Yamamoto, et al.; Application of Chemically Absorbed Fluorocarbon Film with Highly Durability as a Mold Release Agent; Seikei-Kakou vol. 22 No. 2, 2010; pp. 104-114.
JP2015-054439 Office Action dated Aug. 24, 2016; 31 pgs.
TW104122442 Office Action dated Jul. 13, 2016; 24 pgs.
PCT/JP2016/052950 International Search Report dated Apr. 19, 2016; 2 pgs.
CN201680015984.8 Office Action dated Sep. 10, 2019, 13 pgs.
EP20150373.7 Extended European Search Report dated Apr. 7, 2020, 9 pgs.
PCT/JP2017/040099 International Search Report dated Feb. 13, 2018; 4 pgs.
EP17874537.8 Supplementary Search Report dated May 14, 2020, 12 pgs.
CN201680015900.0 Office Action dated Sep. 10, 2019, 13 pgs.
CN201910756415.4 Second Office Action dated Aug. 3, 2021, 7 pgs.
CN201780069802.X First Office Action dated Jul. 31, 2020, 23 pgs.
TW105104027 Office Action dated Jun. 25, 2019; 21 pages.
KR10-2017-7026047 Third Party Observation dated Jan. 11, 2021, 21 pgs.
TW105104050 Office Action dated Aug. 20, 2019; 12 pgs.
CN201810254960.9 Third Office Action dated Dec. 30, 2020, 16 pgs.
EP20150371.1 Extended European Search Report dated Apr. 7, 2020, 8 pgs.
TW105104026 Office Action dated Oct. 5, 2019; 10 pgs.
TW105136889 Second Office Action dated Jan. 7, 2021, 9 pgs.
CN201810254960.9 Office Action dated Oct. 11, 2019, 13 pgs.
Chinese Patent Application No. 201680015984.8 dated Jun. 4, 2019; 8 pgs.
JP2016-17863 Office Action dated Oct. 8, 2019; 11 pgs.
CN201811070889.5 Second Office Action dated Aug. 3, 2020, 16 pgs.
JP2020-55297 Office Action dated May 20, 2021, 7 pgs.
TW106125432 Decision of Rejection dated Apr. 29, 2021, 11 pgs.
JP2017-552695 Second Office Action dated Dec. 2, 2020, 5 pgs.

(56) References Cited

OTHER PUBLICATIONS

JP2017-094366 Office Action dated Nov. 18, 2019, 11 pgs.
CN201680068951.X Office Action dated Sep. 29, 2019; 21 pgs.
CN201910746657.5 Second Office Action dated Jun. 4, 2021, 15 pgs.
CN201810254960.9 Second Office Action dated Jun. 9, 2020, 11 pgs.
JP2016-24288 Opposition Against JP6599789 dated Jun. 24, 2020, 64 pgs.
A Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
JP2017-094366 Office Action dated May 19, 2020, 15 pgs.
CN201811070889.5 Office Action dated Jan. 10, 2020, 15 pgs.
EP20202998.9 Extended European Search Report dated Feb. 1, 2021, 8 pgs.
JP2017-211513 Office Action dated Oct. 6, 2021, 9 pgs.
TW105104240 Office Action dated Oct. 17, 2019, 10 pgs.
TW105104029 Office Action dated Mar. 7, 2019; 12 pgs.
EP17850559.0 Supplementary Search Report dated Mar. 18, 2020, 10 pgs.
CN201810254960.9 Decision of Rejection dated Jun. 30, 2021, 8 pgs.
Chinese Patent Application No. 201680015900.0 dated Jun. 4, 2019; 8 pgs.
KR10-2019-7014887 Second Office Action dated Apr. 12, 2022, 11 pgs.
JP2020-55297 Office Action dated Dec. 23, 2021, 7 pgs.
KR10-2017-7026040 First Office Action dated May 4, 2022, 10 pgs.

\* cited by examiner

HARD COAT LAMINATED FILM

CROSS REFERENCE TO RELATED APPLICATIONS

This application claims the benefit of and priority to PCT/JP2017/027297, filed on Jul. 27, 2017, entitled (translation), "HARD COAT LAMINATED FILM," which claims the benefit of and priority to Japanese Patent Application No. 2016-179105, filed on Sep. 14, 2016, which are hereby incorporated by reference in their entirety into this application.

BACKGROUND

Embodiments relate to a novel hard coat laminated film. More specifically, embodiments relate to a hard coat laminated film which is preferably excellent in ball drop impact resistance.

DESCRIPTION OF RELATED ART

In recent years, touch panels that are installed on image display devices such as liquid crystal displays, plasma displays, and electroluminescence displays and can perform input by touching with fingers, pens, or the like while viewing the display have become widespread.

Conventionally, glass-based articles have been used in a display faceplate of a touch panel since they meet the required properties such as heat resistance, dimensional stability, high transparency, high surface hardness, high rigidity, and the like. Meanwhile, glass has disadvantages such as low impact resistance, low breakability, low processability, difficult handling, high specific gravity, and difficulty in meeting the demand for curved display or flexible display. Therefore, materials that replace glass have been actively studied, and there have been proposed a number of hard coat laminated films in which a hard coat excellent in surface hardness and abrasion resistance is formed on a surface of a transparent resin film, such as triacetyl cellulose, polyethylene terephthalate, polycarbonate, polymethylmethacrylate, and a norbornene-based polymer (for example, see Patent Literatures 1 to 4). However, smartphones or tablet terminals are often accidentally dropped and destroyed during use. As a countermeasure against this, hard coat laminated films are expected to exhibit very high performance in a ball drop test.

CITATION LIST

Patent Literature

PATENT LITERATURE 1: JP-A-2016-060839
PATENT LITERATURE 2: JP-A-2014-152237
PATENT LITERATURE 3: JP-A-2008-201864
PATENT LITERATURE 4: JP-B-5870222

SUMMARY

An object of the various embodiments is to provide a hard coat laminated film having a novel hard coat film composition, and preferably a hard coat laminated film which is excellent in ball drop impact resistance.

Another object of the various embodiments is to provide a hard coat laminated film which is preferably excellent in ball drop impact resistance, surface hardness, transparency, abrasion resistance, bending resistance, color tone, surface appearance, interlayer adhesion strength, and cutting processability, and is suitable as a member of an image display device such as a liquid crystal display, a plasma display, and an electroluminescence display (including an image display device having a touch panel function and an image display device not having a touch panel function; hereinafter, the same thing also applies), particularly a display faceplate of a smartphone or a tablet terminal.

A still another object of the various embodiments is to provide a hard coat laminated film which has both ball drop impact resistance and surface hardness balanced at a high level and is suitable as a member of an image display device such as a liquid crystal display, a plasma display, and an electroluminescence display, particularly a display faceplate of a smartphone or a tablet terminal.

According to at least one embodiment, there is provided a hard coat laminated film including a first hard coat, a second hard coat, and a transparent resin film layer in this order from a surface layer side, where the first hard coat includes: (A) 100 parts by mass of a multifunctional (meth)acrylate; (B) 0.01 to 7 parts by mass of a water repellent; and (C) 0.01 to 10 parts by mass of a silane coupling agent, and the first hard coat is formed from a coating material not containing inorganic particles. According to at least one embodiment, the second hard coat is formed from a coating material including: (D) 100 parts by mass of a polymerizable compound; and (E) 50 to 300 parts by mass of inorganic fine particles having an average particle size of 1 to 300 nm, and the (D) polymerizable compound includes: (d1) a multifunctional (meth)acrylate having three or more (meth)acryloyl groups in one molecule; (d2) a compound having two or more secondary thiol groups in one molecule; and optionally, (d3) one or more (meth)acrylates selected from the group consisting of a (meth)acrylate having two (meth)acryloyl groups in one molecule, a (meth)acrylate having one (meth)acryloyl group in one molecule, and an urethane (meth)acrylate.

According to at least one embodiment, the (D) polymerizable compound is composed of 60 to 30 mass % of the component (d1), 5 to 70 mass % of the component (d2), and 0 to 50 mass % of the component (d3), provided that the sum of the components (d1), (d2), and (d3) is 100 mass %.

According to at least one embodiment, the component (d2) includes a compound having two or three secondary thiol groups in one molecule.

According to at least one embodiment, the amount of the component (d3) in the (D) polymerizable compound is 5 to 50 mass %.

According to at least one embodiment, the component (d2) includes a compound having two or three secondary thiol groups in one molecule, and the amount of the component (d3) in the (D) polymerizable compound is 5 to 50 mass %.

According to at least one embodiment, the component (d3) includes an aliphatic urethane(meth)acrylate having two (meth)acryloyl groups in one molecule, According to at least one embodiment, the component (d3) includes tricyclodecanedimethanol di(meth)acrylate.

According to another embodiment, there is provided a hard coat laminated film including a first hard coat, a second hard coat, and a transparent resin film layer in this order from a surface layer side, where the first hard coat is formed from a coating material not containing inorganic particles, the second hard coat is formed from a coating material containing inorganic fine particles, and the following characteristics (i) and (ii) are satisfied: (i) when a surface opposite to a first hard coat surface of the hard coat laminated film is bonded to a float plate glass, a steel ball with a mass of 110 g is let fall freely on the first hard coat surface from a height of 30 cm, and visual observation is performed from the first hard coat surface side, no trace of impact by the steel ball is recognized; and (ii) a pencil hardness of the first hard coat surface measured according to JIS K5600-5-4:1999 except that a load is 1 kg is 3H or more.

According to at least one embodiment, the second hard coat is formed from a coating material including: (d1) a multifunctional (meth)acrylate having three or more (meth)acryloyl groups in one molecule; (d2) a compound having two or more secondary thiol groups in one molecule; and (E) inorganic fine particles having an average particle size of 1 to 300 nm.

According to at least one embodiment, the second hard coat is formed from a coating material including: (d1) a multifunctional (meth)acrylate having three or more (meth)acryloyl groups in one molecule; (d2) a compound having two or more secondary thiol groups in one molecule; (d3) one or more (meth)acrylates selected from the group consisting of a (meth)acrylate having two (meth)acryloyl groups in one molecule, a (meth)acrylate having one (meth)acryloyl group in one molecule, and an urethane (meth)acrylate; and (E) inorganic fine particles having an average particle size of 1 to 300 nm.

According to at least one embodiment, the following characteristics (iii) and (iv) are further satisfied: (iii) a water contact angle of the first hard coat surface is 100° or more; and (iv) a water contact angle after reciprocally wiping the first hard coat surface with a cotton 20,000 times is 100° or more.

According to another embodiment, there is provided an image display device including the hard coat laminated film according to various embodiments described herein.

According to another embodiment, there is provided an article including the hard coat laminated film according to various embodiments described herein.

DETAILED DESCRIPTION

Figure 1:
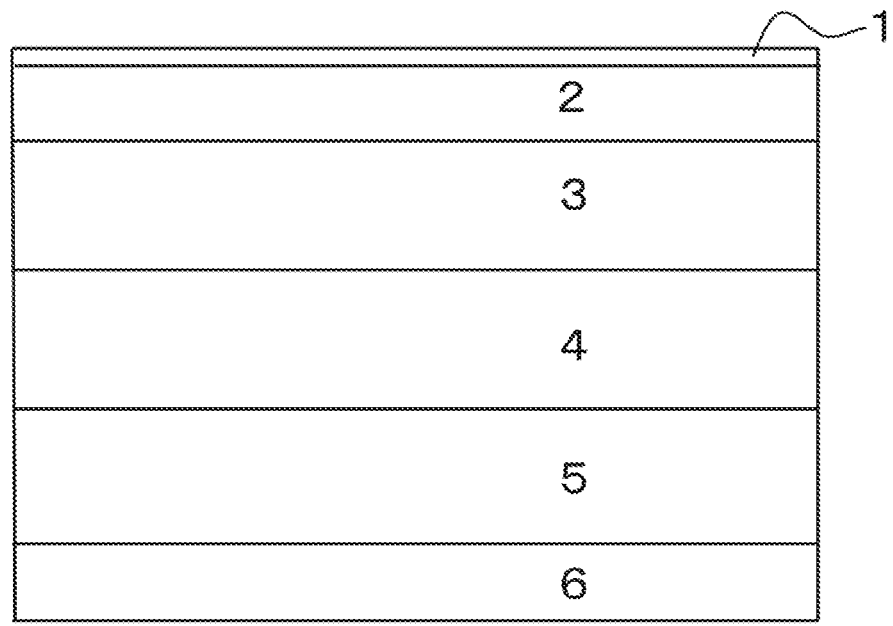
FIG. 1 is a conceptual cross-sectional view illustrating an example of a hard coat laminated film according to an embodiment.

According to various embodiments, the term "film" is used as a term including a sheet. The term "resin" is used as a term including a resin mixture including two or more resins and a resin composition including components other than the resin. In addition, according to various embodiments, sequentially laminating one layer and another layer means both directly laminating the layers and laminating the layers by interposing one or more layers, such as an anchor coat, between the layers. The term "or more" for a numerical range is used to mean a certain numerical value or a numerical value exceeding the certain numerical value. For example, 20% or more means 20% or a value exceeding 20%. The term "or less" for a numerical range is used to mean a certain numerical value or a numerical value less than the certain numerical value. For example, 20% or less means 20% or a value less than 20%. Further, the symbol "-" for a numerical range is used to mean a certain numerical value, a numerical value greater than the certain numerical value and less than another numerical value, or the other numerical value. Here, the other numerical value is a numerical value greater than the certain numerical value. For example, 10-90% means 10%, greater than 10% and less than 90%, or 90%.

Except for Examples or unless otherwise specified, all numerical values used in the present specification and claims should be understood as being modified by the term "about". Without intending to limit the application of the doctrine of equivalents to the scope of the claims, each numerical value should be interpreted in light of significant figures and by applying ordinary rounding techniques.

A hard coat laminated film according to at least one embodiment has a first hard coat, a second hard coat, and a transparent resin film layer in this order from the surface layer side, where the first hard coat is formed from a coating material which does not contain inorganic particles, and the second hard coat is formed from a coating material which contains inorganic particles.

Here, the term "surface layer side" means that an article formed from a hard coat laminated film is closer to an outer surface (a viewing surface in the case of a display faceplate) when provided for on-site use. Also, as used herein, arranging a certain layer on the "surface layer side" of another layer means that the layers are in direct contact with each other and that an additional layer(s) is(are) present between the layers.

Inorganic particles (for example, silica (silicon dioxide); metal oxide particles such as aluminum oxide, zirconia, titania, zinc oxide, germanium oxide, indium oxide, tin oxide, indium tin oxide, antimony oxide, and cerium oxide; metal fluoride particles such as magnesium fluoride and sodium fluoride; metal sulfide particles; metal nitride particles; and metal particles) are effective for increasing the hardness of the hard coat. On the other hand, the interaction with the resin component of the coating material is weak, which causes insufficient ball drop impact resistance or abrasion resistance. Taking into consideration the advantage and disadvantage of inorganic particles, the various embodiments can solve this problem in such a manner that the first hard coat which normally forms the outermost surface does not contain inorganic particles so as to keep ball drop impact resistance or abrasion resistance, and on the other hand, the second hard coat contains preferably a specific amount of inorganic fine particles having an average particle size of 1 nm to 300 nm so as to increase hardness.

Here, "not containing" inorganic particles means that the coating material for forming the first hard coat does not contain a significant amount of inorganic particles. In the field of the coating material for forming the hard coat, the significant amount of inorganic particles is usually about 1 part by mass or more based on 100 parts by mass of the resin component of the coating material. Therefore, in other words, "not containing" inorganic particles means that the amount of the inorganic particles is usually 0 part by mass or more and usually less than 1 part by mass, preferably 0.1 part by mass or less, and more preferably 0.01 part by mass or less based on 100 parts by mass of the resin component of the coating material.

Here, "containing" inorganic particles means that the coating material for forming the second hard coat contains a significant amount of inorganic particles so as to increase the hardness of the hard coat. In the field of the coating material for forming the hard coat, the significant amount for increasing the hardness of the hard coat is usually about 5 parts by mass or more based on 100 parts by mass of the resin component of the coating material. Therefore, in other words, "containing" inorganic particles means that the amount of the inorganic particles is usually 5 parts by mass or more, preferably, 30 parts by mass or more, more preferably 50 parts by mass or more, further preferably 80 parts by mass or more, further preferably 100 parts by mass or more, and most preferably 150 parts by mass or more based on 100 parts by mass of the resin component of the coating material. The upper limit of the amount of the inorganic particles in the coating material for forming the second hard coat is not particularly limited, but for example, may be usually 1,000 parts by mass or less based on 100 parts by mass of the resin component of the coating material.

First Hard Coat

The first hard coat usually forms the surface of the hard coat laminated film according to at least one embodiment. When the hard coat laminated film of according to at least one embodiment is used as a display faceplate of an image display device having a touch panel function, the first hard coat usually forms a touch surface. The first hard coat exhibits satisfactory abrasion resistance and desirably functions to maintain surface properties such as finger slidability even when repeatedly wiped with a handkerchief or the like.

According to at least one embodiment, the coating material for forming the first hard coat is not limited except that it does not contain inorganic particles, and any coating materials can be used. Preferable examples of the coating material for forming the first hard coat include a coating material containing an active energy ray curable resin, which can be polymerized and cured by active energy rays such as ultraviolet rays or electron rays to form the hard coat.

Examples of the active energy ray-curable resin include a (meth)acryloyl group-containing prepolymer or oligomer such as polyurethane (meth)acrylate, polyester (meth)acrylate, polyacryl (meth)acrylate, epoxy (meth)acrylate, polyalkylene glycol poly(meth)acrylate, or polyether (meth)acrylate; a (meth)acryloyl group-containing monofunctional reactive monomer such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth) acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth) acrylate, or trimethylsiloxyethyl methacrylate; a monofunctional reactive monomer such as N-vinylpyrrolidone or styrene; a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate or trimethylolethane tri(meth)acrylate; a (meth)acryloyl group-containing tetrafunctional reactive monomer such as pentaerythritol tetra(meth)acrylate; a (meth)acryloyl group-containing hexafunctional reactive monomer such as dipentaerythritol hexaacrylate; and a polymer (oligomer or prepolymer) comprising one or more of these monomers as constituent monomers. As the active energy ray-curable resin, these compounds can be used singly or in a mixture of two or more kinds thereof. It should be noted that the term (meth)acrylate herein means an acrylate or a methacrylate.

When the hard coat laminated film according to at least one embodiment is used as a display faceplate of an image display device having a touch panel function, particularly a display faceplate of a smartphone or a tablet terminal, a coating material containing (A) a multifunctional (meth) acrylate, (B) a water repellent, and (C) a silane coupling agent and not containing inorganic particles is preferable as the coating material for forming the first hard coat, from a viewpoint of the ball drop impact resistance, surface hardness, transparency, abrasion resistance, bending resistance, color tone, surface appearance, interlayer adhesion strength, and cutting processability. As the coating material for forming the first hard coat, a coating material containing 100 parts by mass of (A) a multifunctional (meth)acrylate, 0.01 to 7 parts by mass of (B) a water repellent, and 0.01 to 10 parts by mass of (C) a silane coupling agent and not containing inorganic particles is more preferable.

(A) Multifunctional (meth)acrylate

According to at least one embodiment, the multifunctional (meth)acrylate of component (A) is a (meth)acrylate having two or more (meth)acryloyl groups in one molecule. Since two or more (meth)acryloyl groups are contained in one molecule, component (A) is polymerized and cured by active energy rays such as ultraviolet rays or electron beams to form the hard coat. In the present specification, the (meth)acryloyl group means an acryloyl group or a methacryloyl group.

Examples of the multifunctional (meth)acrylate include: a (meth)acryloyl group-containing bifunctional reactive monomer such as diethylene glycol di(meth)acrylate, neopentyl glycol di(meth)acrylate, 1,6-hexanediol di(meth) acrylate, polyethylene glycol di(meth)acrylate, 2,2'-bis(4-(meth)acryloyloxypolyethyleneoxyphenyl)propane, and 2,2'-bis(4-(meth)acryloyloxypolypropyleneoxyphenyl)propane; a (meth)acryloyl group-containing trifunctional reactive monomer such as trimethylolpropane tri(meth)acrylate, trimethylol ethane tri(meth)acrylate, and pentaerythritol tri (meth)acrylate; a (meth)acryloyl group-containing tetrafunctional reactive monomer such as pentaerythritol tetra (meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and polymers (oligomers or prepolymers) having one or more of these monomers as a constituent monomer.

As the multifunctional (meth)acrylate of component (A), from a viewpoint of surface hardness and abrasion resistance, a (meth)acrylate having three or more (meth)acryloyl groups in one molecule is preferable, a (meth)acrylate having four or more (meth)acryloyl groups in one molecule is more preferred, a (meth)acrylate having six or more (meth)acryloyl groups in one molecule is further preferable.

As component (A), a mixture of one type or two or more types of these compounds can be used.

(B) Water Repellent

According to at least one embodiment, the water repellent of component (B) functions to improve enhance finger slidability, stain resistance and wipeability against stain.

Examples of the water repellent include: a wax-based water repellent such as a paraffin wax, polyethylene wax, and an acrylic ethylene copolymer wax; a silicone-based water repellent such as a silicone oil, a silicone resin, polydimethylsiloxane, and an alkylalkoxysilane; and a fluorine-based water repellent such as a fluoropolyether-based water repellent and a fluoropolyalkyl-based water repellent. As the water repellent of component (B), a mixture of one type or two or more types of these compounds can be used.

Among them, a fluoropolyether-based water repellent is preferable as the water repellent of component (B) from a viewpoint of water repellency. From the viewpoint that the multifunctional (meth)acrylate of component (A) and the water repellent of component (B) can chemically bond or strongly interact with each other and troubles such as bleeding-out of component (B) can be prevented, a water repellent including a compound containing a (meth)acryloyl group and a fluoropolyether group in a molecule (hereinafter, abbreviated as a (meth)acryloyl group-containing fluoropolyether-based water repellent) is more preferable as component (B). From a viewpoint that the chemical bonding or interaction between the multifunctional (meth)acrylate of component (A) and the water repellent of component (B) can be appropriately controlled to exhibit good water repellency while keeping high transparency, a mixture of an acryloyl group-containing fluoropolyether water repellent and a methacryloyl group-containing fluoropolyether water repellent is more preferable as the water repellent of component (B).

According to at least one embodiment, the (meth)acryloyl group-containing fluoropolyether-based water repellent is clearly distinguished from component (A) in that the (meth) acryloyl group-containing fluoropolyether-based water repellent contains the fluoropolyether group in the molecule. In the present specification, a compound having two or more (meth)acryloyl groups and having a fluoropolyether group in one molecule can be specified into the (meth)acryloyl group-containing fluoropolyether-based water repellent that is component (B). That is, a compound containing a fluoropolyether group is excluded from the definition of the multifunctional (meth)acrylate of component (A).

From a viewpoint of preventing troubles such as bleeding-out of component (B), the amount of the water repellent of component (B) is usually 7 parts by mass or less, preferably 4 parts by mass or less, and more preferably 2 parts by mass or less, based on 100 parts by mass of the multifunctional (meth)acrylate of component (A). On the other hand, from a viewpoint of obtaining the use effect of the water repellent of component (B), the amount of the water repellent of component (B) is usually 0.01 part by mass or more, preferably 0.05 parts by mass or more, and more preferably 0.1 part by mass or more. The amount of the water repellent is usually 0.01 part by mass or more and 7 parts by mass or less, preferably 0.01 part by mass or more and 4 parts by mass or less, or 0.01 part by mass or more and 2 parts by mass or less, or preferably 0.05 parts by mass or more and 7 parts by mass or less, or 0.05 parts by mass or more and 4 parts by mass or less, or 0.05 parts by mass or more and 2 parts by mass or less, or preferably 0.1 part by mass or more and 7 parts by mass or less, or 0.1 part by mass or more and 4 parts by mass or less, or 0.1 part by mass or more and 2 parts by mass or less.

(C) Silane Coupling Agent

According to at least one embodiment, the silane coupling agent of component (C) functions to improve the adhesion between the first hard coat and the second hard coat.

According to at least one embodiment, the silane coupling agent is a silane compound having at least two types of different reactive groups among hydrolyzable groups (for example, an alkoxy group such as a methoxy group and an ethoxy group, an acyloxy group such as an acetoxy group, a halogen group such as a chloro group, or the like) and organic functional groups (for example, an amino group, a mercapto group, a vinyl group, an epoxy group, a methacryloxy group, an acryloxy group, an isocyanate group, or the like). Among them, from a viewpoint of adhesion, the silane coupling agent having an amino group (the silane compound having an amino group and a hydrolyzable group) and the silane coupling agent having a mercapto group (the silane compound having a mercapto group and a hydrolyzable group) are preferable as the silane coupling agent of component (C). From viewpoints of adhesion and odor, the silane coupling agent having an amino group is more preferable.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

As the silane coupling agent of component (C), a mixture of one type or two or more types of these compounds can be used.

From a viewpoint of surely obtaining the adhesion improving effect, the amount of the silane coupling agent of component (C) is usually 0.01 part by mass or more, preferably 0.05 parts by mass or more, and more preferably 0.1 part by mass or more based on 100 parts by mass of the multifunctional (meth)acrylate of component (A). On the other hand, from a viewpoint of the pot life of the coating material, the amount may be usually 10 parts by mass or less, preferably 5 parts by mass or less, and more preferably 1 part by mass or less. The amount of the silane coupling agent is usually 0.01 part by mass or more and 10 parts by mass or less, preferably 0.01 part by mass or more and 5 parts by mass or less, or 0.01 part by mass or more and 1 part by mass or less, or preferably 0.05 parts by mass or more and 10 parts by mass or less, or 0.05 parts by mass or more and 5 parts by mass or less, or 0.05 parts by mass or more and 1 part by mass or less, or preferably 0.1 part by mass or more and 10 parts by mass or less, or 0.1 part by mass or more and 5 parts by mass or less, or 0.1 part by mass or more and 1 part by mass or less.

Any of the ranges of the usual or preferable amount of the silane coupling agent of component (C) described above can be combined with any of the ranges of the usual or preferable amount of the water repellent of component (B) described above.

From a viewpoint of improving curability by active energy rays, the coating material for forming the first hard coat can preferably further contain a compound having two or more isocyanate groups (—N=C=O) in one molecule and/or a photopolymerization initiator.

Examples of the compound having two or more isocyanate groups in one molecule include: methylene bis-4-cyclohexyl isocyanate; polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, and a biuret form of hexamethylene diisocyanate; and a urethane cross-linking agent such as a blocked isocyanate of the polyisocyanate. As the compound having two or more isocyanate groups in one molecule, a mixture of one type or two or more types of these compounds can be used. In addition, at the time of crosslinking, a catalyst such as dibutyltin dilaurate or dibutyltin diethylhexoate may be added as necessary.

Examples of the photopolymerization initiator include: a benzophenone compound such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenylsulfide, 3,3',4,4'-tetra(tert-butylperoxycarbonyl)benzophenone, and 2,4,6-trimethylbenzophenone; a benzoin compound such as benzoin, benzoin methyl ether, benzoin ethyl ether, benzoin isopropyl ether, and benzyl methyl ketal; an acetophenone compound such as acetophenone, 2,2-dimethoxy-2-phenylacetophenone, 1-hydroxy-cyclohexyl phenyl ketone; an anthraquinone compound such as methyl anthraquinone, 2-ethylanthraquinone, and 2-amylanthraquinone; a thioxanthone compound such as thioxanthone, 2,4-diethylthioxanthone, and 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxy ketone compound; and an aminobenzoate compound. As the photopolymerization initiator, a mixture of one type or two or more types of these compounds can be used.

According to at least one embodiment, the coating material for forming the first hard coat may contain, if desired, one type or two or more types of additives such as an antistatic agent, a surfactant, a leveling agent, a thixotropy imparting agent, a fouling inhibitor, a printability improving agent, an antioxidant, a weather resistance stabilizer, a light resistance stabilizer, a UV absorber, a heat stabilizer, organic fine particles, and an organic colorant.

According to at least one embodiment, the coating material for forming the first hard coat may contain a solvent, if desired, so as to dilute the coating material to a concentration at which coating is facilitated. The solvent is not particularly limited as long as the solvent neither reacts with any of components (A) to (C) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, a mixture of one type or two or more types of these compounds can be used.

According to at least one embodiment, the coating material for forming the first hard coat can be obtained by mixing and stirring these components.

According to at least one embodiment, the method of forming the first hard coat by using the coating material for forming the first hard coat is not particularly limited, and a known web coating method can be used. Examples of the above-described method include roll coating, gravure coating, reverse coating, roll brushing, spray coating, air knife coating, and die coating.

From a viewpoint of ball drop impact resistance, abrasion resistance, and hardness, the thickness of the first hard coat may be preferably 0.5 µm or more, and more preferably 1 µm or more. On the other hand, from a viewpoint of hardness and adhesion to the second hard coat, the thickness of the first hard coat may be preferably 5 µm or less, more preferably 4 µm or less, and further preferably 3 µm or less. The thickness of the first hard coat may be preferably 0.5 µm or more and 5 µm or less, 0.5 µm or more 4 µm or less, 0.5 µm or more and 3 µm or less, 1 µm or more and 5 µm or less, 1 µm or more and 4 µm or less, or 1 µm or more and 3 µm or less.

Second Hard Coat

In one aspect, the coating material for forming the second hard coat is not limited except that it contains inorganic particles, and any coating materials can be used. Preferable examples of the coating material for forming the second hard coat include a coating material which further contains an active energy ray curable resin and can be polymerized and cured by active energy rays such as ultraviolet rays or electron rays to form a hard coat.

According to at least one embodiment, the active energy ray curable resin has been described above in the description of the coating material for forming the first hard coat. As the active energy ray curable resin, a mixture of one type or two or more types of these compounds can be used.

When the hard coat laminated film according to at least one embodiment is used as a display faceplate of an image display device having a touch panel function, particularly a display faceplate of a smartphone or a tablet terminal, a coating material containing (d1) a multifunctional (meth)acrylate having three or more (meth)acryloyl groups in one molecule, (d2) a compound having two or more secondary thiol groups in one molecule, and (E) inorganic fine particles having an average particle size of 1 to 300 nm is preferable as the coating material for forming the second hard coat, from a viewpoint of the ball drop impact resistance, surface hardness, transparency, abrasion resistance, bending resistance, color tone, surface appearance, interlayer adhesion strength, and cutting processability.

A coating material containing (d1) a multifunctional (meth)acrylate having three or more (meth)acryloyl groups in one molecule, (d2) a compound having two or more secondary thiol groups in one molecule, (d3) one or more (meth)acrylates selected from the group consisting of a (meth)acrylate having two (meth)acryloyl groups in one molecule, a (meth)acrylate having one (meth)acryloyl group in one molecule, and an urethane (meth)acrylate, and (E) inorganic fine particles having an average particle size of 1 to 300 nm is also preferable as the coating material for forming the second hard coat.

According to at least one embodiment, a coating material containing (D) 100 parts by mass of a polymerizable compound and (E) 50 to 300 parts by mass of inorganic fine particles having an average particle size of 1 to 300 nm, where (D) the polymerizable compound contains (d1) 60 to 30 mass % of a multifunctional (meth)acrylate having three or more (meth)acryloyl groups in one molecule, (d2) 5 to 70 mass % of a compound two or more secondary thiol groups in one molecule, and (d3) 0 to 50 mass % of one or more (meth)acrylates selected from the group consisting of a (meth) acrylate having two (meth)acryloyl groups in one molecule, a (meth)acrylate having one (meth)acryloyl group in one molecule, and an urethane (meth)acrylate is also preferable as the coating material for forming the second hard coat. Here, the sum of component (d1), component (d2), and component (d3) is 100 mass %.

(d1) Multifunctional (Meth)Acrylate Having Three or More (Meth)Acryloyl Groups in One Molecule Component (d1) is a multifunctional (meth)acrylate having three or more (meth)acryloyl groups in one molecule. Component (d1) functions to increase surface hardness.

Examples of component (d1) include: a (meth)acryloyl group-containing trifunctional reactive monomer such as trimethylol propane tri(meth)acrylate, trimethylol ethane tri(meth)acrylate, and pentaerythritol tri(meth)acrylate; a (meth)acryloyl group-containing tetrafunctional reactive monomer such as pentaerythritol tetra(meth)acrylate; a (meth)acryloyl group-containing hexafunctional reactive monomer such as dipentaerythritol hexaacrylate; a (meth) acryloyl group-containing octafunctional reactive monomer such as tripentaerythritol acrylate; and polymers (oligomers or prepolymers) having one or more of these monomers as a constituent monomer. As component (d1), a mixture of one type or two or more types of these compounds can be used.

(d2) Compound Having Two or More Secondary Thiol Groups in One Molecule

Component (d2) is a compound having two or more secondary thiol groups in one molecule. Component (d2) functions to improve ball drop impact resistance. Component (d2) functions to dramatically improve ball drop impact resistance by interacting with component (d3).

According to at least one embodiment, a compound having two or more secondary thiol groups and having a (meth)acryloyl group in one molecule is specified into component (d2).

Component (d2) may have one or two or more polymerizable functional groups other than secondary thiol group such as a (meth)acryloyl group, a vinyl group, an epoxy group, and an isocyanate group in one molecule. However, from a viewpoint of ball drop impact resistance, those having no polymerizable functional groups are preferred.

Examples of the compound having two or more secondary thiol groups in one molecule include 1,4-bis(3-mercaptobutyryloxy)butane, 1,3,5-tris(3-mercaptobutyryloxyethyl)-1,3,5-triazine-2,4,6(1H,3H,5H)-trione, trimethylolpropane tris(3-mercaptobutyrate), trimethylol ethane tris(3-mercaptobutyrate), and pentaerythritol tetrakis(3-mercaptobutyrate). Among them, a compound having two or three secondary thiol groups in one molecule is preferable from a viewpoint of ball drop impact resistance. As component (d2), a mixture of one type or two or more types of these compounds can be used.

(d3) (Meth)Acrylate Having Two (Meth)Acryloyl Groups in One Molecule, Etc.

Component (d3) is one or more (meth)acrylates selected from the group consisting of a (meth)acrylate having two (meth)acryloyl groups in one molecule, a (meth)acrylate having one (meth)acryloyl group in one molecule, and an urethane (meth)acrylate. Component (d3) preferably contains an aliphatic urethane (meth)acrylate having two (meth) acryloyl groups. Component (d3) functions to improve ball drop impact resistance. Component (d3) functions to dramatically improve ball drop impact resistance by interacting with component (d2). In the present specification, an urethane (meth)acrylate having three or more (meth)acryloyl groups in one molecule is specified into component (d3).

Examples of the (meth)acrylate having one or two (meth) acryloyl groups in one molecule include a prepolymer or an oligomer such as polyester (meth)acrylate, polyacrylic (meth)acrylate, polyalkylene glycol poly(meth)acrylate, an epoxy (meth)acrylate, and polyether (meth)acrylate, which has one or two (meth)acryloyl groups in one molecule.

Examples of the (meth)acrylate having two (meth)acryloyl groups in one molecule include diethylene glycol di(meth)acrylate, neopentyl glycol di(meth)acrylate, 1,6-hexanediol di(meth)acrylate, polyethylene glycol di(meth) acrylate, 2,2'-bis(4-(meth)acryloyloxypolyethyleneoxyphenyl)propane, and 2,2'-bis(4-(meth)acryloyloxypolypropyleneoxyphenyl)propane.

According to at least one embodiment, the (meth)acrylate having two (meth)acryloyl groups in one molecule is not particularly limited, but typically, may be a compound having a structure represented by the following general formula (1). In the formula, $R_1$ and $R_2$ are each independently —H (hydrogen atom) or —CH$_3$ (methyl group). $R_3$ is an aliphatic alkylene group which may have a branched alkyl group, a cyclic hydrocarbon group, an ether group, or a hydroxyl group as the substituent or in the backbone. $R_3$ may be typically "—(CH$_2$)$_n$—". Here, n may be usually a natural number of 2 or more, preferably 4 to 20, and more preferably 6 to 12. $R_3$ may preferably contain a bridged cyclic hydrocarbon group. Examples of the bridged cyclic hydrocarbon include bicyclo[2.1.0]pentane, bicyclo[2.1.1] hexane, bicyclo[2.2.1]heptane, bicyclo[2.2.1]hept-2-ene, bicyclo[3.2.1]octane, tricyclo[3.2.1.0$^{2,7}$]octane, and an adamantane.

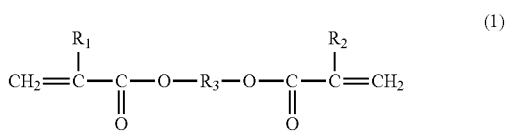

(1)

According to at least one embodiment, the (meth)acrylate having two (meth)acryloyl groups in one molecule is not particularly limited, but may be more preferably a tricyclodecanedimethanol di(meth)acrylate. By including this compound in the coating material for forming the second hard coat, abrasion resistance, in particular steel wool resistance, can be surprisingly greatly improved although the second hard coat is not a layer forming the surface of the hard coat laminated film. For example, when a test piece of the hard coat laminated film according to Example 14 (that is the working example described later) using tricyclodecanedimethanol diacrylate was placed in a Gakushin tester of JIS L0849:2013 such that the first hard coat was the front surface, thereafter, #0000 steel wool was attached on a friction terminal of the Gakushin tester, a 500 g load was then applied, the surface of the test piece was then ecipro-cally rubbed 500 times under the conditions of a friction terminal moving speed of 300 mm/min and a moving distance of 30 mm, and the friction site was visually observed; any scratch was not recognized.

According to at least one embodiment, the tricyclodecanedimethanol di(meth)acrylate is a compound having a structure represented by the following general formula (2). In the formula, $R_1$ and $R_2$ are each independently —H (hydrogen atom) or —CH$_3$ (methyl group).

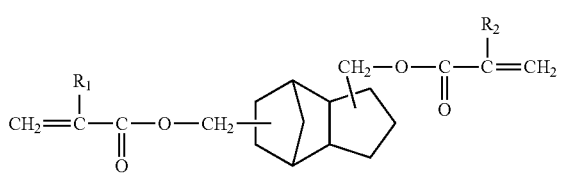

(2)

Examples of the (meth)acrylate having one (meth)acryloyl group in one molecule include methyl (meth)acrylate, ethyl (meth)acrylate, n-butyl (meth)acrylate, hexyl (meth) acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth) acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth) acrylate, and trimethylsiloxyethyl methacrylate.

Examples of the (meth)acrylate having one (meth)acryloyl group in one molecule include a (meth)acrylic acid adduct of an ester or ester derivative, and an N-substituted (meth)acrylamide compound.

According to at least one embodiment, the (meth)acrylic acid adduct of an ester or ester derivative is not particularly limited, but typically, may be a compound having a structure represented by the following general formula (3). In the formula, $R_1$ represents a hydrogen atom or a methyl group. $R_2$ and $R_3$ are each independently an aliphatic alkylene group which may have a branched alkyl group, a cyclic hydrocarbon group, an ether group, or a hydroxyl group as the substituent or in the backbone. $R_2$ and $R_3$ may be typically "—$(CH_2)_n$—". Here, n may be usually a natural number of 1 or more, preferably 1 to 20, and more preferably 2 to 12. $R_4$ is an aliphatic alkyl group which may have a hydrogen atom or a branched alkyl group, a cyclic hydrocarbon group, an ether group, or a hydroxyl group as the substituent or in the backbone.

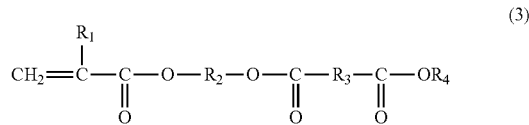

(3)

Examples of the (meth)acrylic acid adduct of an ester or ester derivative include 2-(meth)acryloyloxyethyl-succinic acid, 2-acryloyloxyethyl hexahydrophthalic acid, and 2-acryloyloxyethyl-2-hydroxyethyl-phthalic acid.

According to at least one embodiment, the N-substituted (meth)acrylamide compound is not particularly limited, but typically, may be a compound having a structure represented by the following general formula (4). In the formula, $R_1$ represents a hydrogen atom or a methyl group. $R_2$ represents a hydrogen atom or an alkyl group having 1 to 6 carbon atoms, and $R_3$ represents an alkyl group having 1 to 6 carbon atoms which may have a hydroxyl group or an amino group. Or, $R_2$ and $R_3$ may be combined together with each other via a nitrogen atom so as to form a 5- or 6-membered ring which may have an oxygen atom as a ring member. The "N-substituted (meth)acrylamide compound" means an N-substituted acrylamide compound or an N-substituted methacrylamide compound.

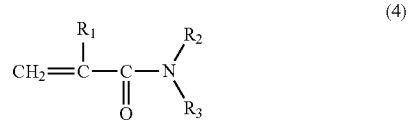

(4)

Examples of the N-substituted (meth)acrylamide compound include N-methyl (meth)acrylamide, N-methylol (meth)acrylamide butyl ether, N-ethyl (meth)acrylamide, N-n-propyl (meth)acrylamide, N-isopropyl (meth)acrylamide, N-cyclopropyl (meth)acrylamide, diacetone (meth)acrylamide, N-hydroxymethyl (meth)acrylamide, N-hydroxyethyl (meth)acrylamide, N,N-dimethyl (meth)acrylamide, N,N-diethyl (meth)acrylamide, N-methyl, N-ethyl (meth)acrylamide, N,N-dimethylaminopropyl (meth)acrylamide, N-methylol (meth)acrylamide methyl ether, N-methylol (meth)acrylamide ethyl ether, N-methylol (meth)acrylamide propyl ether, N-butoxymethyl (meth)acrylamide, N-vinyl-2-pyrrolidone, N-vinyl-ε-caprolactam, and (meth)acryloyl morpholine.

According to at least one embodiment, the urethane (meth)acrylate is a compound having a urethane structure (—NH—CO—O—) or a derivative thereof, which has one or more (meth)acryloyl groups. In the present specification, an urethane (meth)acrylate having three or more (meth)acryloyl groups in one molecule is specified into component (d3).

According to at least one embodiment, the urethane (meth)acrylate is not particularly limited, but may be typically those produced using a compound having two or more isocyanate groups (—N═C═O) in one molecule, a polyol compound, and a hydroxyl group-containing (meth)acrylate, that is, those containing structural units derived from these compounds.

Examples of the compound having two or more isocyanate groups in one molecule include a compound having two isocyanate groups in one molecule such as diphenylmethane diisocyanate, hexamethylene diisocyanate, isophorone diisocyanate, tolylene diisocyanate, and methylene bis(4-cyclohexyl isocyanate).

Examples of the compound having two or more isocyanate groups in one molecule include polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, and biuret form of hexamethylene diisocyanate.

As the compound having two or more isocyanate groups in one molecule, a mixture of one type or two or more types of these compounds can be used.

Examples of the polyol compound include polyether polyol, polyester polyol, and polycarbonate polyol.

Examples of the polyether polyol include: polyalkylene glycol such as polyethylene glycol, polypropylene glycol, and polytetramethylene glycol; polyalkylene oxide such as polyethylene oxide and polypropylene oxide; a copolymer of ethylene oxide and propylene oxide; a copolymer of ethylene oxide and tetrahydrofuran; a copolymer of a dihydric phenol compound and polyoxyalkylene glycol; and a copolymer of a dihydric phenol and one or more alkylene oxides having 2 to 4 carbon atoms (for example, ethylene oxide, propylene oxide, 1,2-butylene oxide, 1,4-butylene oxide, or the like).

Examples of the polyester polyol include poly(ethylene adipate), poly(butylene adipate), poly(neopentyl adipate), poly(hexamethylene adipate), poly(butylene azelaate), poly (butylene sebacate), and polycaprolactone.

Examples of the polycarbonate polyol include poly(butanediol carbonate), poly(hexanediol carbonate), and poly (nonanediol carbonate).

As the polyol compound, a mixture of one type or two or more types of these compounds can be used.

Examples of the hydroxyl group-containing (meth)acrylate include: a hydroxyalkyl (meth)acrylate such as 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, and 2-hydroxy-3-(meth)acryloyloxypropyl (meth)acrylate; a glycol (meth)acrylate such as dipropylene glycol (meth)acrylate, polyethylene glycol mono(meth)acrylate, and polypropylene glycol mono(meth)acrylate; a glycerin (meth)acrylate such as glycerin di(meth)acrylate; a glycidyl (meth)acrylate such as a fatty acid-modified glycidyl (meth)acrylate; a phosphorus atom-containing (meth)acrylate such as 2-hydroxyethyl acryloyl phosphate; a (meth)acrylic acid adduct of an ester or ester derivative such as 2-(meth)acryloyloxyethyl-2-hydroxypropyl phthalate; a pentaerythritol (meth) acrylate such as pentaerythritol tri(meth)acrylate, dipentaerythritol penta(meth)acrylate, an ethylene oxide-modified pentaerythritol tri(meth)acrylate, and an ethylene oxide modified dipentaerythritol penta(meth)acrylate; and a caprolactone-modified (meth)acrylate such as a caprolactone-modified 2-hydroxyethyl (meth)acrylate, a caprolactone-modified pentaerythritol tri(meth)acrylate, and a caprolactone-modified dipentaerythritol penta(meth)acrylate.

As the hydroxyl group-containing (meth)acrylate, a mixture of one type or two or more types of these compounds can be used.

From a viewpoint of ball drop impact resistance, the number of the (meth)acryloyl groups of the urethane (meth) acrylate may be usually 12 or less, preferably 6 or less, more preferably 4 or less, further preferably 3 or less, and most preferably 2. On the other hand, from a viewpoint of scratch resistance, the number of the (meth)acryloyl groups of the urethane (meth)acrylate may be usually two or more.

According to at least one embodiment, the urethane (meth)acrylate includes an aliphatic urethane (meth)acrylate having two (meth)acryloyl groups in one molecule.

As component (d3), a mixture of one type or two or more types of (meth)acrylates selected from the group consisting of a (meth)acrylate having two (meth)acryloyl groups in one molecule, a (meth)acrylate having one (meth)acryloyl group in one molecule, and an urethane (meth)acrylate can be used.

In addition, although not intended to be limited thereto, typical examples of component (d3) include (d3-1) to (d3-10) used in the examples described later.

From a viewpoint of ball drop impact resistance, the proportion of component (d1) in the (D) polymerizable compound may be usually 60 mass % or less, and preferably 55 mass % or less. On the other hand, from a viewpoint of surface hardness, the proportion of component (d1) may be usually 30 mass % or more, and preferably 40 mass % or more. The proportion of component (d1) in the (D) polymerizable compound may be usually 60 to 30 mass %, preferably 60 to 40 mass %, 55 to 30 mass %, or 55 to 40 mass %. From a viewpoint of ball drop impact resistance, the proportion of component (d2) in the (D) polymerizable compound may be usually 5 mass % or more, and preferably 20 mass % or more. On the other hand, from a viewpoint of surface hardness, the proportion of component (d2) may be usually 70 mass % or less, and preferably 50 mass % or less. The proportion of component (d2) in the (D) polymerizable compound may be usually 5 to 70 mass %, preferably 5 to 50 mass %, 20 to 70 mass %, or 20 to 50 mass %. From a viewpoint of ball drop impact resistance, the proportion of component (d3) in the (D) polymerizable compound may be usually 0 mass % or more, preferably 5 mass % or more, more preferably 10 mass % or more, and further preferably 15 mass % or more. On the other hand, from a viewpoint of surface hardness, the proportion of component (d3) may be usually 50 mass % or less, preferably 40 mass % or less, and more preferably 35 mass % or less. The proportion of component (d3) in the (D) polymerizable compound may be usually 0 to 50 mass %, preferably 0 to 40 mass %, 0 to 35 mass %, 5 to 50 mass %, 5 to 40 mass %, 5 to 35 mass %, 10 to 50 mass %, 10 to 40 mass %, 10 to 35 mass %, 15 to 50 mass %, 15 to 40 mass %, or 15 to 35 mass %. Here, the sum of component (d1), component (d2), and component (d3) is 100 mass %.

(E) Inorganic Fine Particles Having Average Particle Size of 1 to 300 nm

The inorganic fine particles of component (E) functions to dramatically enhance the surface hardness of the hard coat laminated film according to at least one embodiment.

Examples of the inorganic fine particles include: silica (silicon dioxide); metal oxide fine particles such as aluminum oxide, zirconia, titania, zinc oxide, germanium oxide, indium oxide, tin oxide, indium tin oxide, antimony oxide, and cerium oxide; metal fluoride fine particles such as magnesium fluoride and sodium fluoride; metal sulfide fine particles; metal nitride fine particles; and metal fine particles.

Among them, fine particles of silica or aluminum oxide are preferable so as to obtain a hard coat having high surface hardness, and fine particles of silica are more preferable. Commercially available products of the silica fine particles include Snowtex (trade name) manufactured by Nissan Chemical Industries, Ltd., Quartron (trade name) manufactured by Fuso Chemical Industry Co., Ltd., and the like.

For the purpose of improving the dispersibility of the inorganic fine particles in the coating material and improving the surface hardness of the obtained hard coat, the surface of the inorganic fine particles may be preferably treated with: a silane coupling agent such as a vinylsilane and an aminosilane; a titanate-based coupling agent; an aluminate-based coupling agent; an organic compound having an ethylenically unsaturated bond group such as a (meth)acryloyl group, a vinyl group, and an allyl group, or a reactive functional group such as an epoxy group; and a surface treating agent such as a fatty acid and a metal salt of a fatty acid, or the like. Such surface-treated inorganic fine particles also fall within the category of the term "inorganic particles" which is defined by the requirement according to at least one embodiment that they are not contained in the coating material for forming the first hard coat.

As the inorganic fine particles of component (E), a mixture of one or two or more types of the compounds can be used.

From a viewpoint of reliably obtaining the effect of improving the hardness of the hard coat, the average particle size of the inorganic fine particles of component (E) is usually 300 nm or less, preferably 200 nm or less, and more preferably 120 nm or less. On the other hand, the lower limit of the average particle size is not particularly limited, but normally available inorganic fine particles are at most 1 nm in average particle size.

According to at least one embodiment, the average particle size of the inorganic fine particles is a particle size at which the accumulation from the smaller particle side becomes 50 mass % in a particle size distribution curve measured by using a laser diffraction/scattering type particle size analyzer "MT3200II" (trade name) manufactured by Nikkiso Co., Ltd.

From a viewpoint of surface hardness, the amount of the inorganic fine particles of component (E) may be usually 50 parts by mass or more, preferably 80 parts by mass or more, more preferably 100 parts by mass or more, and further preferably 150 parts by mass or more, based on 100 parts by mass of the polymerizable compound of component (D). On the other hand, from a viewpoint of transparency, the amount of the inorganic fine particles of component (E) may be usually 300 parts by mass or less, and preferably 240 parts by mass or less. The amount of the inorganic fine particles of component (E) may be usually 50 parts by mass or more and 300 parts by mass or less, preferably 50 parts by mass or more and 240 parts by mass or less, 80 parts by mass or more and 300 parts by mass or less, 80 parts by mass or more and 240 parts by mass or less, 100 parts by mass or more and 300 parts by mass or less, 100 parts by mass or more and 240 parts by mass or less, 150 parts by mass or more and 300 parts by mass or less, or 150 parts by mass or more and 240 parts by mass or less, based on 100 parts by mass of the polymerizable compound of component (D).

(F) Leveling Agent

From a viewpoint of making the surface state of the second hard coat good (smooth) and facilitating the formation of the first hard coat, the coating material for forming the second hard coat may preferably contain (F) a leveling agent.

Examples of the leveling agent of component (F) include an acrylic-based leveling agent, a silicone-based leveling agent, a fluorine-based leveling agent, a silicone/acrylic copolymer-based leveling agent, a fluorine-modified acrylic-based leveling agent, a fluorine-modified silicone-based leveling agent, and a leveling agent into which a functional group (for example, an alkoxy group such as a methoxy group and an ethoxy group, an acyloxy group, a halogen group, an amino group, a vinyl group, an epoxy group, a methacryloxy group, an acryloxy group, an isocyanate group, or the like) is introduced. Among them, the silicone/acrylic copolymer-based leveling agent is preferable as the leveling agent of component (F). As the leveling agent of component (F), a mixture of one type or two or more types of these compounds can be used.

From a viewpoint of improving the surface state of the second hard coat and facilitating the formation of the first hard coat, the amount of the leveling agent of component (F) may be usually 0.01 part by mass or more, preferably 0.1 part by mass or more, and more preferably 0.2 parts by mass or more, based on 100 parts by mass of the polymerizable compound of component (D). On the other hand, from a viewpoint of making it possible to satisfactorily apply the coating material for forming the first hard coat onto the second hard coat without being repelled, the amount of the leveling agent of component (F) may be usually 1 part by mass or less, preferably 0.6 parts by mass or less, and more preferably 0.4 parts by mass or less. The amount of the leveling agent of component (F) may be 0.01 part by mass or more and 1 part by mass or less, preferably 0.01 part by mass or more and 0.6 parts by mass or less, 0.01 part by mass or more and 0.4 parts by mass or less, 0.1 part by mass or more and 1 part by mass or less, 0.1 part by mass or more and 0.6 parts by mass or less, 0.1 part by mass or more and 0.4 parts by mass or less, 0.2 parts by mass or more and 1 part by mass or less, 0.2 parts by mass or more and 0.6 parts by mass or less, or 0.2 parts by mass or more and 0.4 parts by mass or less, based on 100 parts by mass of the polymerizable compound of component (D).

Any of the usual or preferred range group of the amount of the leveling agent of component (F) described above can be combined with any of the usual or preferred range group of the amount of the inorganic fine particles of component (E) described above.

From a viewpoint of improving curability by active energy rays, the coating material for forming the second hard coat may preferably further contain a compound having two or more isocyanate groups (—N═C═O) in one molecule and/or a photopolymerization initiator.

According to at least one embodiment, the compound having two or more isocyanate groups in one molecule has been described above in the description of the coating material for forming the first hard coat. As the compound having two or more isocyanate groups in one molecule, a mixture of one type or two or more types of these compounds can be used.

According to at least one embodiment, the photopolymerization initiator has been described above in the description of the coating material for forming the first hard coat. As the photopolymerization initiator, a mixture of one type or two or more types of these compounds can be used.

According to at least one embodiment, the coating material for forming the second hard coat may contain, if desired, one type or two or more types of additives such as an antistatic agent, a surfactant, a thixotropy imparting agent, a fouling inhibitor, a printability improving agent, an antioxidant, a weather resistance stabilizer, a light resistance stabilizer, a UV absorber, a heat stabilizer, a colorant, and organic fine particles.

According to at least one embodiment, the coating material for forming the second hard coat may contain a solvent, if desired, so as to dilute the coating material to a concentration at which coating is facilitated. The solvent is not particularly limited as long as the solvent neither reacts with any of component (D), component (E) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among them, 1-methoxy-2-propanol is preferable. As the solvent, a mixture of one type or two or more types of these compounds can be used.

According to at least one embodiment, the coating material for forming the second hard coat can be obtained by mixing and stirring these components.

According to at least one embodiment, the method of forming the second hard coat by using the coating material for forming the second hard coat is not particularly limited, and a known web coating method can be used. Examples of the above method include roll coating, gravure coating, reverse coating, roll brushing, dip coating, spray coating, spin coating, air knife coating, and die coating.

From a viewpoint of surface hardness, the thickness of the second hard coat may be usually 5 µm or more, preferably 10 µm or more, more preferably 15 µm or more, and further preferably 18 µm or more. On the other hand, from a viewpoint of curling resistance, the thickness of the second hard coat may be preferably 30 µm or less, more preferably 27 µm or less, and further preferably 25 µm or less.

According to at least one embodiment, the thickness of the second hard coat may be preferably 5 µm or more and 30 µm or less, more preferably 5 µm or more and 27 µm or less, 5 µm or more and 25 µm or less, 10 µm or more and 30 µm or less, 10 µm or more and 27 µm or less, 10 µm or more and 25 µm or less, 15 µm or more and 30 µm or less, 15 µm or more and 27 µm or less, 15 µm or more and 25 µm or less, 18 µm or more and 30 µm or less, 18 µm or more and 27 µm or less, or 18 µm or more and 25 µm or less.

Any of the preferred range of the thicknesses of the second hard coat described above can be combined with any of the preferred range of the thicknesses of the first hard coat described above.

Transparent Resin Film

According to at least one embodiment, the transparent resin film serves as a layer to be a transparent film substrate on which the first hard coat and the second hard coat are formed. The transparent resin film is not limited except that the transparent resin film has high transparency and is not colored, and any transparent resin film can be used. Examples of the transparent resin film include films such as a cellulose ester resin such as triacetyl cellulose, a polyester resin such as polyethylene terephthalate, a cyclic hydrocarbon resin such as ethylene norbornene copolymer, an acrylic resin such as polymethyl methacrylate and polymethyl methacrylate, a poly(meth)acrylimide resin, an aromatic polycarbonate resin, a polyolefin resin such as polypropylene and 4-methyl-pentene-1, a polyamide resin, a polyarylate resin, a polymer type urethane acrylate resin, and a polyimide resin. These films include unstretched films, uniaxially stretched films, and biaxially stretched films. In addition, a laminated film obtained by laminating two or more layers of one or more of these films may be included.

According to at least one embodiment, the thickness of the transparent resin film is not particularly limited and can be set to any thickness as desired. From a viewpoint of handling of the hard coat laminated film according to at least one embodiment, the thickness of the transparent resin film may be usually 20 µm or more, and preferably 50 µm or more. In the case in which the hard coat laminated film according to at least one embodiment is used as a display faceplate, the thickness of the transparent resin film may be usually 300 µm or more, preferably 500 µm or more, and more preferably 600 µm or more, from a viewpoint of keeping rigidity. Further, from a viewpoint of meeting the demand for reducing the thickness of the device, the thickness of the transparent resin film may be usually 1,500 µm or less, preferably 1,200 µm or less, and more preferably 1,000 µm or less. In the case in which the hard coat laminated film according to at least one embodiment is used for applications not requiring high rigidity other than the display faceplate of the touch panel, the thickness of the transparent resin film may be usually 250 µm or less, and preferably 150 µm or less from a viewpoint of cost reduction.

According to at least one embodiment, the transparent resin film is preferably a transparent resin film made from an acrylic resin.

Examples of the acrylic resins include a (meth)acrylic acid ester (co)polymer, a copolymer mainly containing a structural unit derived from a (meth)acrylic acid ester (usually 50 mol % or more, preferably 65 mol % or more, and more preferably 70 mol % or more), and modified products thereof. The term "(meth)acrylic" means acrylic or methacrylic. The term (co)polymer means a polymer or a copolymer.

Examples of the (meth)acrylic acid ester (co)polymer include poly(methyl (meth)acrylate), poly(ethyl(meth)acrylate), poly(propyl(meth)acrylate), poly(butyl(meth)acrylate), a methyl (meth)acrylate-butyl (meth)acrylate copolymer, and an ethyl (meth)acrylate-butyl (meth)acrylate copolymer.

Examples of the copolymer mainly containing the structural unit derived from a (meth)acrylic acid ester include an ethylene-methyl (meth)acrylate copolymer, a styrene-methyl (meth)acrylate copolymer, a vinyl cyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction, and a polymer into which an imide structure is introduced by reacting with an imidizing agent such as methylamine, cyclohexylamine and ammonia (hereinafter referred to as a poly(meth)acrylimide resin).

Examples of the transparent resin film of the acrylic resin include a film formed from a mixture of one type or two or more types of the compounds. In addition, a laminated film obtained by laminating two or more layers of one or more of these films may be included.

According to at least one embodiment, the transparent resin film is more preferably a film made from a vinyl cyclohexane/methyl (meth)acrylate copolymer. The use of the vinyl cyclohexane/methyl (meth)acrylate copolymer enables the formation of a hard coat laminated film excellent in ball drop impact resistance, surface hardness, abrasion resistance, transparency, surface smoothness, appearance, rigidity, and moisture resistance. Such a hard coat laminated film can be suitably used as a display faceplate of a smartphone or a tablet terminal. The content of the structural unit derived from methyl (meth)acrylate in the vinyl cyclohexane/methyl (meth)acrylate copolymer may be usually 50 to 95 mol %, preferably 65 to 90 mol %, and more preferably 70 to 85 mol % based on 100 mol % of the sum of the structural units derived from all the polymerizable monomers. Here, the term "polymerizable monomer" means methyl (meth)acrylate, vinylcyclohexane, or a monomer copolymerizable therewith. The copolymerizable monomer is usually a compound having a carbon-carbon double bond, and is typically a compound having an ethylenic double bond.

According to at least one embodiment, the transparent resin film is more preferably a film made from a poly(meth)acrylimide resin. The use of the poly(meth)acrylimide resin enables the formation of a hard coat laminated film excellent in ball drop impact resistance, surface hardness, abrasion resistance, transparency, surface smoothness, appearance, rigidity, heat resistance, and dimensional stability under heat. Such a hard coat laminated film can be suitably used as a display faceplate or a transparent conductive substrate of a smartphone or a tablet terminal.

According to at least one embodiment, the yellowness index of the acrylic resin (measured according to JIS K7105: 1981 by using a chromometer "SolidSpec-3700" (trade name) manufactured by Shimadzu Corporation) may be preferably 3 or less, more preferably 2 or less, and further preferably 1 or less. The use of an acrylic resin having a yellowness index of 3 or less can lead to the formation of a hard coat laminated film which can be suitably used as a member of an image display device. Lower yellowness index is preferable.

From a viewpoint of the extrusion load and the stability of the molten film, the melt mass flow rate of the acrylic resin (measured according to ISO 1133 under the conditions of 260° C. and 98.07 N) may be preferably 0.1 to 20 g/10 min, more preferably and 0.5 to 10 g/10 min.

If desired, the acrylic resin can contain a core-shell rubber. When the core-shell rubber is used in an amount of usually 0 to 100 parts by mass, preferably 3 to 50 parts by mass, and more preferably 5 to 30 parts by mass based on 100 parts by mass of the acrylic resin, the cutting processability or impact resistance can be enhanced. In another aspect, the amount of the core-shell rubber may be 0 to 50 parts by mass, 0 to 30 parts by mass, preferably 3 to 100 parts by mass, 3 to 30 parts by mass, 5 to 100 parts by mass, or 5 to 50 parts by mass, based on 100 parts by mass of the acrylic resin.

Examples of the core-shell rubber include a methacrylate/styrene/butadiene rubber graft copolymer, an crylonitrile styrene/butadiene rubber graft copolymer, an acrylonitrile styrene/ethylene propylene rubber graft copolymer, an acrylonitrile styrene/acrylate graft copolymer, a methacrylate/acrylate rubber graft copolymer, and a methacrylate/acrylonitrile/acrylate rubber graft copolymer. As the core-shell rubber, a mixture of one type or two or more types of these compounds can be used.

If desired, as long as it does not contradict the purpose of the various embodiments, the acrylic resin can further contain: a thermoplastic resin other than the acrylic resin or the core-shell rubber; a pigment, an inorganic filler, an organic filler, or a resin filler; and an additive such as a lubricant, an antioxidant, a weather resistance stabilizer, a heat stabilizer, a release agent, an antistatic agent, and a surfactant. Usually, the amount of the optional component(s) may be about 0.01 to 10 parts by mass based on 100 parts by mass of the acrylic resin.

More preferably, the transparent resin film is a transparent multilayer film in which a first acrylic resin layer ($\alpha$1), an aromatic polycarbonate resin layer ($\beta$), and a second acrylic resin layer ($\alpha$2) are directly laminated in this order. The various embodiments will be hereinafter described on the assumption that a touch surface is formed on the $\alpha$1 layer side.

An acrylic resin is excellent in surface hardness, but tends to be insufficient in cutting processability. An aromatic polycarbonate resin is excellent in cutting processability, but tends to be insufficient in surface hardness. Therefore, by using the transparent multilayer film having the above-described layer configuration, it is possible to easily obtain a hard coat laminated film that is excellent in both surface hardness and cutting processability by supplementing the weak points of the two resins.

According to at least one embodiment, the layer thickness of the $\alpha$1 layer is not particular limited, but from a viewpoint of the surface hardness of the hard coat laminated film, it may be usually 20 μm or more, preferably 40 μm or more, more preferably 60 μm or more, and further preferably 80 μm or more.

According to at least one embodiment, the layer thickness of the $\alpha$2 layer is not particularly limited, but from a viewpoint of the curling resistance of the hard coat laminated film, it is preferable that the layer thickness is the same as that of the $\alpha$1 layer.

Here, "the same layer thickness" should not be interpreted as the same layer thickness in a physicochemically strict sense. It should be interpreted as the same layer thickness within the range of the deflection width of the process and quality control which is usually performed industrially. If the same layer thickness is within the range of the deflection width of the process and quality control which is commonly performed industrially, the curling resistance of the multilayer film can be kept satisfactory. In the case of an unstretched multilayer film by a T die coextrusion method, for example, when the set layer thickness is 70 μm, since the process and quality control is commonly performed with a width of about −5 to +5 μm, the layer thickness of 65 μm and the thickness of 75 μm should be interpreted as the same. Here, the "same layer thickness" can also be said as "substantially the same layer thickness".

The layer thickness of the 13 layer is not particularly limited, but from a viewpoint of the cutting processability of the hard coat laminated film according to at least one embodiment, it may be usually 20 μm or more, and preferably 80 μm or more.

As the acrylic resin used for the $\alpha$1 layer and the $\alpha$2 layer, those described above can be used.

Acrylic resins having different resin properties, for example, acrylic resins that are different in kind, melt mass flow rate, glass transition temperature, or the like, may be used as the acrylic resins for the $\alpha$1 and $\alpha$2 layers. From a viewpoint of the curling resistance of the hard coat laminated film according to at least one embodiment, it is preferable to use those having the same resin properties. For example, the use of the same lot of the same grade is one of preferred embodiments.

Examples of the aromatic polycarbonate resin usable for the 13 layer include one type or a mixture of two or more types of aromatic polycarbonate resins such as a polymer obtained by an interfacial polymerization method of phosgene and an aromatic dihydroxy compound such as bisphenol A, dimethyl bisphenol A, and 1,1-bis(4-hydroxyphenyl)-3,3,5-trimethylcyclohexane; and a polymer obtained by a transesterification reaction of a carbonic diester such as diphenyl carbonate and an aromatic dihydroxy compound such as bisphenol A, dimethyl bisphenol A, and 1,1-bis(4-hydroxyphenyl)-3,3,5-trimethylcyclohexane.

Examples of the preferable optional components that can be contained in the aromatic polycarbonate resin include a core-shell rubber. When the total of the aromatic polycarbonate resin and the core-shell rubber is 100 parts by mass, 0 to 30 parts by mass of the core-shell rubber (100 to 70 parts by mass of the aromatic polycarbonate resin), and preferably 0 to 10 parts by mass of the core-shell rubber (100 to 90 parts by mass of the aromatic polycarbonate resin) can be used to further enhance the cutting processability or the impact resistance of the hard coat laminated film.

Examples of the core-shell rubber include a methacrylate/styrene/butadiene rubber graft copolymer, an acrylonitrile styrene/butadiene rubber graft copolymer, an acrylonitrile styrene/ethylene propylene rubber graft copolymer, an acrylonitrile styrene/acrylate graft copolymer, a methacrylate/acrylate rubber graft copolymer, and a methacrylate/acrylonitrile/acrylate rubber graft copolymer. As the core-shell rubber, a mixture of one type or two or more types of these compounds can be used.

If desired, as long as it does not contradict the purpose of a various embodiments, the aromatic polycarbonate resin can further contain: a thermoplastic resin other than the aromatic polycarbonate resin or the core-shell rubber; a pigment, an inorganic filler, an organic filler, or a resin filler; and an additive such as a lubricant, an antioxidant, a weather resistance stabilizer, a heat stabilizer, a release agent, an antistatic agent, and a surfactant. Usually, the amount of the optional component(s) is about 0.01 to 10 parts by mass when the total of the aromatic polycarbonate resin and the core-shell rubber is 100 parts by mass.

According to at least one embodiment, the method for producing the transparent resin film is not particularly limited. When the transparent resin film is a film made from a poly(meth)acrylimide resin, preferable examples of the production method is a method described in JP-A-2015-033844. When the transparent resin film is a transparent multilayer film in which a first acrylic resin layer ($\alpha$1), an aromatic polycarbonate resin layer ($\beta$), and a second acrylic resin layer ($\alpha$2) are directly laminated in this order, preferable examples of the production method is a method disclosed in JP-A-2015-083370. Also, in forming the hard coat, an easy adhesion treatment such as corona discharge treatment or anchor coat formation may be performed in advance on the hard coat forming side or both sides of the transparent resin film so as to increase the adhesion strength to the hard coat.

It is more preferable that the hard coat laminated film according to at least one embodiment has the first hard coat, the second hard coat, the transparent resin film layer, and a third hard coat in this order from the surface layer side. By forming the third hard coat, both the force for curling the hard coat laminated film to one side (hereinafter abbreviated as curling force) and the force for curling the film to the other side work. The occurrence of the curling can be suppressed by offsetting the two curling forces to zero. The coating material for forming the third hard coat and the thickness of the third hard coat are not particularly limited as long as the two curling forces can be offset. The coating material for forming the third hard coat and the thickness of the third hard coat may be, for example, those described above for the second hard coat.

In recent years, for the purpose of reducing a weight of an image display device, a touch panel having a two-layer structure in which a touch sensor is directly formed on a back side of a display faceplate (so-called one glass solution) has been proposed. In order to further reduce the weight, one plastic solution that replaces so-called one-glass solution has also been proposed. When the hard coat laminated film according to at least one embodiment is used in one plastic solution that replaces so-called one glass solution, it is easy to impart suitable characteristics as a printing surface by forming the third hard coat.

The hard coat laminated film according to at least one embodiment may have, if desired, an optional layer other than the first hard coat, the second hard coat, the transparent resin film layer, and the third hard coat. Examples of the optional layer include a hard coat other than the first to third hard coats, an anchor coat, a pressure-sensitive adhesive layer, a transparent conductive layer, a high refractive index layer, a low refractive index layer, and an antireflection functional layer.

FIG. 1 is a conceptual cross-sectional view illustrating an example of the hard coat laminated film according to at least one embodiment. The exemplary hard coat laminated film has a first hard coat 1, a second hard coat 2, a first poly(meth)acrylimide resin layer ($\alpha$1) 3, an aromatic polycarbonate resin layer ($\beta$) 4, a second poly(meth)acrylimide resin layer ($\alpha$2) 5, and a third hard coat 6 in this order from the surface layer side (i.e., the touch surface side in the case of a touch panel).

For the hard coat laminated film according to at least one embodiment, it is preferable that any trace of impact by a steel ball is not recognized when the surface opposite to the first hard coat surface is bonded to a float plate glass, the steel ball with a mass of 110 g is let fall freely on the first hard coat surface from a height of 30 cm, and visual observation is performed from the first hard coat surface side. The height measured for the hard coat laminated film according to at least one embodiment according to test (i) in the examples described later is more preferably 40 cm or more, further preferably 50 cm or more, still more preferably 60 cm or more, still more preferably 70 cm or more, and most preferably 80 cm or more. It is preferable that the height is higher. By satisfying this criterion, a smartphone or a tablet terminal in which the hard coat laminated film according to at least one embodiment is used as a display faceplate can be expected to be not broken even if it is accidentally dropped during use.

For the hard coat laminated film according to at least one embodiment, the pencil hardness measured for the first hard coat surface according to JIS K5600-5-4:1999, except that the load is 1 kg, by using a pencil "Uni" (trade name) manufactured by Mitsubishi Pencil Corporation may be preferably 3H or more, more preferably 4H or more, and further preferably 5 H or more. It is preferable that the pencil hardness is higher. Due to such a pencil hardness of the first hard coat surface, the hard coat laminated film according to at least one embodiment can be suitably used as a display faceplate.

For the hard coat laminated film according to at least one embodiment, it is preferable that the height measured according to test (i) in the examples described later is 30 cm or more and the pencil hardness may be 3 H or more, and it is more preferable that the height measured according to test (i) in the examples described later is 30 cm or more and the pencil hardness is 4 H or more, the height measured according to test (i) in the examples described later is 30 cm or more and the pencil hardness is 5 H or more, the height measured according to test (i) in the examples described later is 40 cm or more and the pencil hardness is 3 H or more, the height measured according to test (i) in the examples described later is 40 cm or more and the pencil hardness is 4 H or more, the height measured according to test (i) in the examples described later is 40 cm or more and the pencil hardness is 5 H or more, the height measured according to test (i) in the examples described later is 50 cm or more and the pencil hardness is 3 H or more, the height measured according to test (i) in the examples described later is 50 cm or more and the pencil hardness is 4 H or more, the height measured according to test (i) in the examples described later is 50 cm or more and the pencil hardness is 5 H or more, the height measured according to test (i) in the examples described later is 60 cm or more and the pencil hardness is 3 H or more, the height measured according to test (i) in the examples described later is 60 cm or more and the pencil hardness is 4 H or more, the height measured according to test (i) in the examples described later is 60 cm or more and the pencil hardness is 5 H or more, the height measured according to test (i) in the examples described later is 70 cm or more and the pencil hardness is 3 H or more, the height measured according to test (i) in the examples described later is 70 cm or more and the pencil hardness is 4 H or more, the height measured according to test (i) in the examples described later is 70 cm or more and the pencil hardness is 5 H or more, the height measured according to test (i) in the examples described later is 80 cm or more and the pencil hardness is 3 H or more, the height measured according to test (i) in the examples described later is 80 cm or more and the pencil hardness is 4 H or more, or the height measured according to test (i) in the examples described later is 80 cm or more and the pencil hardness is 5 H or more.

For the hard coat laminated film according to at least one embodiment, the water contact angle of the surface of the first hard coat may be preferably 100° or more, and more preferably 105° or more. When the hard coat laminated film according to at least one embodiment is used as a display faceplate of a touch panel, the first hard coat usually forms a touch surface. When the water contact angle of the surface of the first hard coat is 100° or more, the touch panel can be operated while sliding a finger or pen on the touch surface by an operator as desired. From a viewpoint of smoothly sliding the finger or pen, the water contact angle is preferably high. Although there is no particular upper limit to the water contact angle, usually about 120° is sufficient from a viewpoint of finger slidability. Here, the water contact angle is a value measured according to test (iii) in the examples described later.

For the hard coat laminated film according to at least one embodiment, it is preferable that the water contact angle after reciprocatingly wiping the surface of the first hard coat with a cotton 20,000 times may be 100° or more. It is more preferable that the water contact angle after reciprocating wiping with a cotton 25,000 times may be 100° or more. If the water contact angle after wiping with a cotton 20,000 times is 100° or more, surface properties such as finger slidability can be maintained even when wiped repeatedly with a handkerchief or the like. It is more preferable that the number of times of cotton wiping that can maintain the water contact angle of 100° or more is greater. Here, the water contact angle after wiping with a cotton is a value measured according to test (iv) in the examples described later.

For the hard coat laminated film according to at least one embodiment, it is preferable that the water contact angle on the surface of the first hard coat is 100° or more and the water contact angle after reciprocatingly wiping the surface of the first hard coat with a cotton 20,000 times is 100° or more. Further, for the hard coat laminated film according to at least one embodiment, it is more preferable that the water contact angle on the surface of the first hard coat is 100° or more and the water contact angle after reciprocatingly wiping the surface of the first hard coat with a cotton 25,000 times is 100° or more, the water contact angle on the surface of the first hard coat is 105° or more and the water contact angle after reciprocatingly wiping the surface of the first hard coat with a cotton 20,000 times is 100° or more, or the water contact angle on the surface of the first hard coat is 105° or more and the water contact angle after reciprocatingly wiping the surface of the first hard coat with a cotton 25,000 times is 100° or more.

In addition, for the hard coat laminated film according to at least one embodiment, any of the above-described preferable ranges of the height and/or the pencil hardness measured according to test (i) of the examples described later can be combined with any of the above-described ranges of the water contact angle on the surface of the first hard coat and/the water contact angle after reciprocatingly wiping the surface of the first hard coat with a cotton 25,000 times.

For the hard coat laminated film according to at least one embodiment, the total light transmittance (measured according to JIS K7361-1:1997 by using a turbidimeter "NDH 2000" (trade name) manufactured by Nippon Denshoku Industries Co., Ltd.) may be preferably 85% or more, more preferably 88% or more, and further preferably 90% or more. When the hard coat laminated film according to at least one embodiment has a total light transmittance of 85% or more, it can be suitably used as a member of an image display device. A higher total light transmittance is preferable.

The yellowness index of the hard coat laminated film according to at least one embodiment (measured according to JIS K7105:1981 by using a chromometer "SolidSpec-3700" (trade name) manufactured by Shimadzu Corporation) may be preferably 3 or less, more preferably 2 or less, and further preferably 1 or less. When the hard coat laminated film according to at least one embodiment has a yellowness index of 3 or less, it can be suitably used as a member of an image display device. A lower yellowness index is preferable.

The hard coat laminated film according to at least one embodiment may have a minimum bending radius of preferably 40 mm or less, more preferably 35 mm or less, and further preferably 30 mm or less. When the minimum bending radius is preferably 40 mm or less, the hard coat laminated film according to at least one embodiment can be easily handled as a film roll, which is advantageous in terms of production efficiency or the like. A smaller minimum bending radius is preferable. Here, the minimum bending radius is a value measured according to test (viii) in the examples described later.

According to at least one embodiment, the minimum bending radius is a bending radius immediately before the occurrence of cracks on the surface of the bent portion when the hard coat laminated film is folded, and is an index indicating the limit of bending. The bending radius is defined similarly to the radius of curvature.

Figure 2:
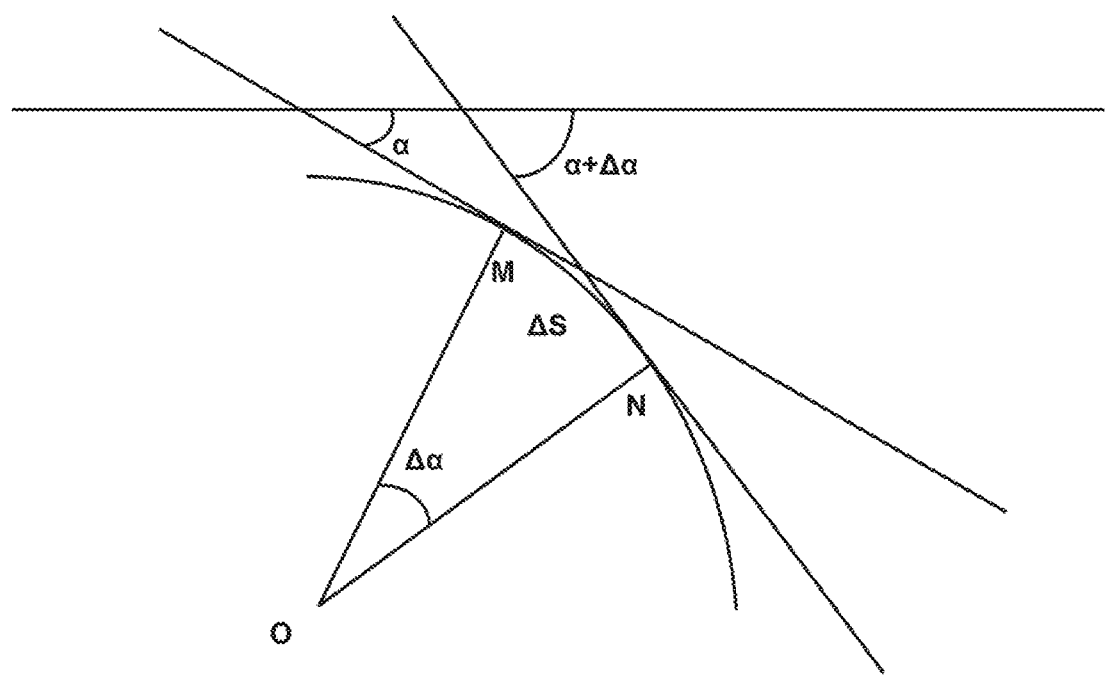
FIG. 2 is a view for explaining a radius of curvature.

According to at least one embodiment, the radius of curvature is defined as follows with reference to FIG. 2. If a length from an M point to an N point of a curve is $\Delta S$; a difference between a slope of a tangent at the M point and a slope of a tangent at the N point is $\Delta \alpha$; and an intersection point of a straight line perpendicular to the tangent at the M point and intersecting at the M point and a straight line perpendicular to the tangent at the N point and intersecting at the N point is O, when $\Delta S$ is sufficiently small, the curve from the M point to the N point can be approximated to a circular arc (FIG. 2). The radius at this time is defined as the radius of curvature. Further, if the radius of curvature is R, $\square MON = \Delta \alpha$ and $\Delta \alpha$ is also sufficiently small when $\Delta S$ is sufficiently small. Thus, $\Delta S = R \Delta \alpha$ is established and $R = \Delta S / \Delta \alpha$.

For the hard coat laminated film according to at least one embodiment, any of the above-described preferred ranges of the height measured according to test (i) in the examples described later and/or the pencil hardness and/or the water contact angle on the surface of the first hard coat and/or the water after wiping the surface of the first hard coat with a cotton 25,000 times can be combined with any of the above-described preferred ranges of total light transmittance and/or yellowness index and/or minimum bending radius.

Producing Method

The method of producing the hard coat laminated film according to various embodiments is not particularly limited and can be produced by any methods.

From a viewpoint of adhesion between the first hard coat and the second hard coat, preferred examples of the producing method include a method including: (1) a step of forming a wet coat of the coating material for forming the second hard coat on the transparent resin film; (2) a step of irradiating the wet coat of the coating material for forming the second hard coat with active energy rays in an integrated light amount of 1 to 230 mJ/cm$^2$, preferably 5 to 200 mJ/cm$^2$, more preferably 10 to 160 mJ/cm$^2$, still more preferably 20 to 120 mJ/cm$^2$, and most preferably 30 to 100 mJ/cm$^2$, and making the wet coat of the coating material for forming the second hard coat into a coat of a set-to-touch state; (3) a step of forming a wet coat of the coating material for forming the first hard coat on the set-to-touch state coat of the coating material for forming the second hard coat; and (4) preheating the wet coat of the coating material for forming the first hard coat to a temperature of 30 to 100° C., preferably 40 to 85° C., and more preferably 50 to 75° C., and irradiating the wet coat with active energy rays in an integrated light amount of 240 to 10,000 mJ/cm$^2$, preferably 320 to 5,000 mJ/cm$^2$, and more preferably 360 to 2,000 mJ/cm$^2$.

In the step (1), the method of forming the wet coat of the coating material for forming the second hard coat is not particularly limited, and a known web coating method can be used. Specifically, examples of the method include roll coating, gravure coating, reverse coating, roll brushing, spray coating, air knife coating, and die coating.

The wet coat of the coating material for forming the second hard coat obtained in the step (1) is converted into the set-to-touch state in the step (2) or a tack-free state, and it will not cause troubles concerning handling such as sticking even if directly touching a web device. Therefore, in the next step (3), the wet coat of the coating material for forming the first hard coat can be formed on the set-to-touch state coat of the coating material for forming the second hard coat.

In the present specification, the phrase "the coat is in a set-to-touch state (in a tack-free state)" means that there is no trouble concerning handling even if the coat directly touches a web device.

The irradiation of the active energy rays in the step (2) may be appropriately controlled depending on the properties of the coating material used as the coating material for forming the second hard coat. However, from a viewpoint of reliably making the coat into the set-to-touch state, the irradiation of the active energy rays is performed such that the integrated light amount is usually 1 mJ/cm$^2$ or more, preferably 5 mJ/cm$^2$ or more, more preferably 10 mJ/cm$^2$ or more, further preferably 20 mJ/cm$^2$ or more, and most preferably 30 mJ/cm$^2$ or more. On the other hand, from a viewpoint of adhesion between the first hard coat and the second hard coat, the irradiation of the active energy rays is performed such that the integrated light amount is usually 230 mJ/cm$^2$ or less, preferably 200 mJ/cm$^2$ or less, more preferably 160 mJ/cm$^2$ or less, further preferably 120 mJ/cm$^2$ or less, and most preferably 100 mJ/cm$^2$ or less.

It is preferable to preliminarily dry the wet coat of the coating material for forming the second hard coat before the irradiation of the active energy rays in the step (2). The preliminary drying can be performed, for example, by passing the web through the inside of a drying furnace in which a temperature is set at about 23 to 150° C., and preferably 50 to 120° C. at a line speed such that the time required for passing from the entrance to the exit is about 0.5 to 10 minutes, and preferably 1 to 5 minutes.

When the irradiation of the active energy rays is performed in the step (2), the wet coat of the coating material for forming the second hard coat may be preheated to a temperature of 40 to 120° C., and preferably 70 to 100° C. It is possible to reliably making the coat into the set-to-touch state. The preheating method is not particularly limited and can be performed by any method. Specific examples of the method will be illustrated later in the description of the following step (4).

In the step (3), the method of forming the wet coat of the coating material for forming the first hard coat is not particularly limited, and a known web coating method can be used. Specifically, examples of the method include roll coating, gravure coating, reverse coating, roll brushing, spray coating, air knife coating, and die coating.

The wet coat of the coating material for forming the first hard coat obtained in the step (3) is completely cured in the step (4). At the same time, the coat of the coating material for forming the second hard coat is also completely cured.

The above method can enhance adhesiveness between the first hard coat and the second hard coat, and without wishing to be bound by any theory it is presumed that the reason is that complete curing is simultaneously achieved for both the hard coats by limiting the integrated light amount in irradiation with active energy rays to an amount adequate to convert the coat into a coat in a set-to-touch state but inadequate to completely cure the coat in the step (2) and setting the integrated light amount to an amount adequate to completely cure the coats in the step (4) for the first time.

From a viewpoint of completely curing the coat and from a viewpoint of adhesion between the first hard coat and the second hard coat, the irradiation of the active energy rays in the step (4) is performed such that the integrated light amount is 240 mJ/cm$^2$ or more, preferably 320 mJ/cm$^2$ or more, and further preferably 360 mJ/cm$^2$ or more. On the other hand, from a viewpoint of preventing the obtained hard coat laminated film from becoming yellowed and from a viewpoint of costs, the irradiation is performed such that the integrated light amount is 10,000 mJ/cm$^2$ or less, preferably 5,000 mJ/cm$^2$ or less, and more preferably 2,000 mJ/cm$^2$ or less.

It is preferable to preliminarily dry the wet coat of the coating material for forming the first hard coat before the irradiation of the active energy rays in the step (4). The preliminary drying can be performed, for example, by passing the web through the inside of a drying furnace in which a temperature is set at about 23 to 150° C., and preferably 50 to 120° C. at a line speed such that the time required for passing from the entrance to the exit is about 0.5 to 10 minutes, and preferably 1 to 5 minutes.

Figure 3:
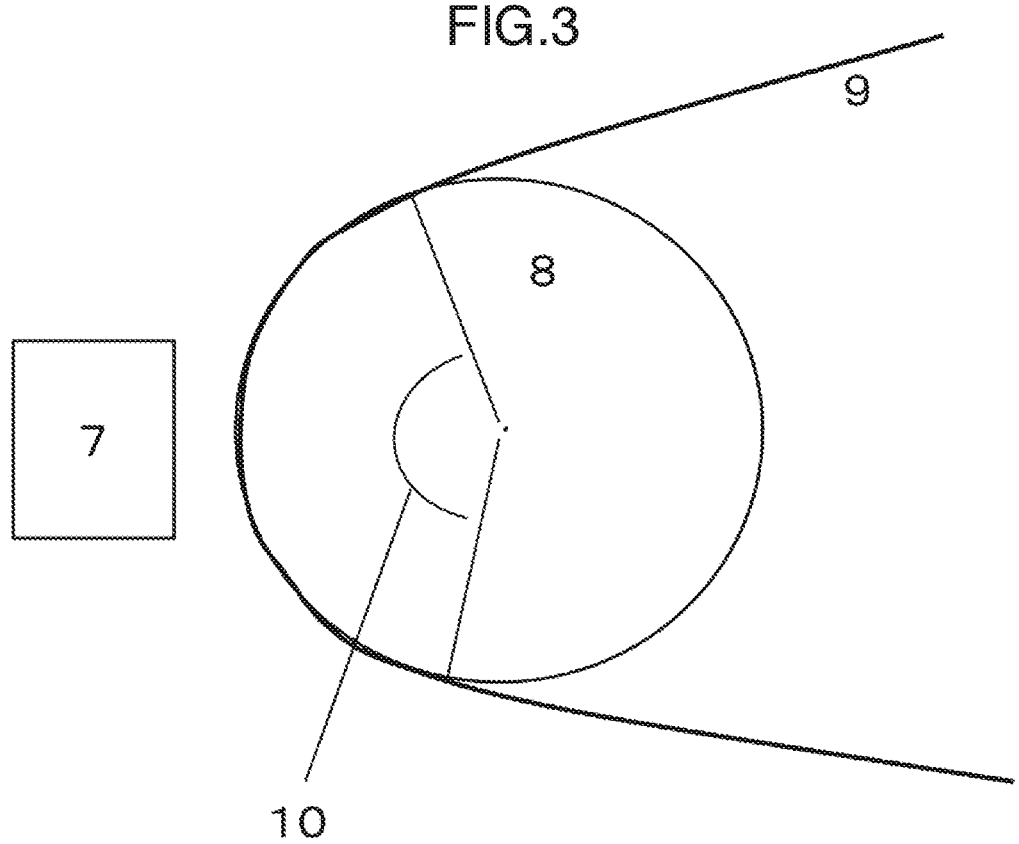
FIG. 3 is a conceptual view illustrating an example of an ultraviolet irradiation device.

From a viewpoint of obtaining good interlayer adhesion strength even when the properties of the coating material for forming the first hard coat and the coating material for forming the second hard coat are greatly different from each other in the irradiation of the active energy rays of the step (4), the wet coat of the coating material for forming the first hard coat may be usually preheated at a temperature of 30 to 100° C., preferably 40 to 85° C., and more preferably 50 to 75° C. The preheating method is not particularly limited and can be performed by any method. Examples of the preheating method include: a method of controlling the surface temperature of a mirror-finished metal roll 8 to a predetermined temperature by holding a web 9 on the mirror-finished metal roll 8 opposed to an active energy ray irradiation device 7 as illustrated in FIG. 3; a method of surrounding an active energy ray irradiation device as an irradiation furnace and controlling the temperature inside the irradiation furnace to a predetermined temperature; and a combination thereof.

After the step (4), an aging treatment may be performed. The properties of the hard coat laminated film can be stabilized thereby.

Article

Since the hard coat laminated film according to at least one embodiment has preferable properties as described above, it can be suitably used as an article or a member of an article. The term "article" as used herein is not particularly limited as long as it is an article including the hard coat laminated film according to at least one embodiment (where a member of an article is embranced within the definition of the term "article"). Examples of the article (including the member of the article) include: an image display device such as a liquid crystal display, a plasma display, and an electroluminescence display, and a member thereof such as a display faceplate, a transparent conductive substrate, and a housing thereof; a television, a personal computer, a tablet type information device, a smart phone, and a member thereof such as a housing and a display faceplate thereof; a refrigerator, a washing machine, a cupboard, a costume shelf, and panels constituting them; a building window or door; a vehicle, a vehicle window, a windshield, a roof window, and an instrument panel; an electronic signage and a protective plate thereof; a show window; and a member such as a solar cell, and a member thereof such as a housing or front plate thereof.

In the production of the article according to at least one embodiment, in order to impart high designability to the obtained article, a decorative sheet may be laminated on the surface opposite to the front surface of the hard coat laminated film according to at least one embodiment (i.e., the surface that is normally visually recognized when the article is used for actual use; hereinafter, the same thing also applies). Such an embodiment is particularly effective when the hard coat laminated film is used as a front panel of a door body for opening and closing the front portion of the main body of an article such as a refrigerator, a washing machine, a dish rack, a costume shelf, and the like, or a flat panel of a lid for opening/closing a front portion of the main body of an article. The decorative sheet is not limited and any decorative sheets can be used. Examples of the decorative sheet include any colored resin sheets.

The colored resin sheet is not particularly limited, but examples thereof include: a polyester resin such as aromatic polyester and aliphatic polyester; an acrylic resin; a polycarbonate resin; a poly(meth)acrylimide resin; a polyolefin resin such as polyethylene, polypropylene, and polymethyl pentene; a cellulose resin such as cellophane, triacetyl cellulose, diacetyl cellulose, and acetyl cellulose butyrate; a styrene resin such as polystyrene, an acrylonitrile butadiene styrene copolymer resin (ABS resin), a styrene ethylene propylene styrene copolymer, a styrene ethylene ethylene propylene styrene copolymer, and a styrene ethylene butadiene styrene copolymer; a polyvinyl chloride resin; a polyvinylidene chloride resin; a fluorine-containing resin such as polyvinylidene fluoride; and polyvinyl alcohol, ethylene vinyl alcohol, polyether ether ketone, nylon, polyamide, polyimide, polyurethane, polyether imide, polysulfone, and polyethersulfone. These sheets include unstretched sheets, uniaxially oriented sheets, and biaxially oriented sheets. In addition, a laminated sheet obtained by laminating two or more layers of one or more of these sheets may be included.

The thickness of the colored resin sheet is not particularly limited, but it may be usually 20 μm or more, preferably 50 μm or more, and more preferably 80 μm or more. In addition, from a viewpoint of meeting the demand for reducing the thickness of the article, the thickness of the colored resin sheet may be usually 1,500 μm or less, preferably 800 μm or less, and more preferably 400 μm or less. The thickness of the colored resin sheet may be usually 20 μm or more and 1,500 μm or less, preferably 20 μm or more and 800 μm or less, 20 μm or more and 400 μm or less, 50 μm or more and 1,500 μm or less, 50 μm or more and 800 μm or less, 50 μm or more and 400 μm or less, 80 μm or more and 1,500 μm or less, 80 μm or more and 800 μm or less, or 80 μm or more and 400 μm or less.

A printed layer may be provided on the front side surface of the colored resin sheet, if desired, so as to enhance the sense of design. The printed layer is provided for imparting high designability. The printed layer can be formed by printing any pattern by using any ink and any printing machine.

The printing can be wholly or partially performed on the surface opposite to the front surface of the hard coat laminated film according to at least one embodiment and/or on the front side surface of the colored resin sheet directly or via an anchor coat. Examples of the pattern include a metal tone pattern such as a hair line, a wood grain pattern, a stone pattern imitating a surface of a rock such as marble, a fabric pattern imitating a texture or cloth pattern, a tile sticker pattern, a brickwork pattern, a parquet pattern, and a patchwork. As the printing ink, a material in which a pigment, a solvent, a stabilizer, a plasticizer, a catalyst, a curing agent, and the like are appropriately mixed with a binder can be used. Examples of the binder include resins, such as a polyurethane resin, a vinyl chloride/vinyl acetate copolymer resin, a vinyl chloride/vinyl acetate/acrylic copolymer resin, a chlorinated polypropylene resin, an acrylic resin, a polyester resin, a polyamide resin, a butyral resin, a polystyrene type resin, a nitrocellulose resin, and a cellulose acetate resin, and resin compositions thereof. Further, in order to apply a metallic design thereto, aluminum, tin, titanium, indium, and oxides thereof may be wholly or partly vapor-deposited by a known method on the surface opposite to the front surface of the hard coat laminated film according to at least one embodiment and/or on the front side surface of the colored resin sheet directly or via an anchor coat.

The lamination of the hard coat laminated film according to at least one embodiment and the decorative sheet is not particularly limited and can be performed by any methods. Examples of the method include a dry laminating method using a known adhesive, and a method of forming a layer made of a known pressure-sensitive adhesive and then superposing and pressing both the hard coat laminated film and the decorative sheet.

EXAMPLES

Hereinafter, the various embodiments will be described with reference to Examples, but the various embodiments are not limited thereto.

Measuring Methods (i) Ball Drop Test (Ball Drop Impact Resistance)

A sheet-like pressure-sensitive adhesive having a thickness of 25 μm ("8146-1" (trade name) of 3M Co., Ltd.) is laminated on an entire surface of one side of a float plate glass (thickness of 3 mm) prescribed in JIS R3202:2011 of Test Piece Co., Ltd., and further, a hard coat laminated film was laminated on the surface of the sheet-like pressure-sensitive adhesive in such a manner that the surface opposite to the first hard coat was a bonding surface thereby preparing a test piece. Next, 110 g of a steel ball was let fall freely from a predetermined height on the test surface of the test piece (i.e., the first hard coat surface of the hard coat laminated film). Subsequently, when the test piece was visually observed from the first hard coat surface side, it was evaluated as "pass" if no trace of impact by the steel ball was recognized, and it was evaluated as "fail" if a trace of impact was recognized due to the occurrence of a fine crack (even if the trace is slight). The height was changed and the test was repeated to obtain the maximum height to pass.

(ii) Pencil Hardness

The pencil hardness was measured for the first hard coat surface of a hard coat laminated film according to JIS K5600-5-4 by using a pencil "UNI" (trade name) of Mitsubishi Pencil Co., Ltd under the condition of a load of 1 kg.

(iii) Water Contact Angle (Initial Water Contact Angle)

The water contact angle was measured for the first hard coat surface of a hard coat laminated film with an automatic contact angle meter "DSA 20 (trade name)" available from KRUSS GmbH by using a method to calculate from the width and the height of a water drop (as indicated in JIS R3257:1999).

(iv) Abrasion Resistance (Water Contact Angle after Wipes with Cotton)

A test piece of a hard coat laminated film was prepared in a size of 150 mm length and 50 mm width so that the machine direction of the hard coat laminated film corresponded to the longitudinal direction of the test piece. The test piece was placed on a Gakushin-type tester in accordance with JIS L0849:2013 so that the first hard coat of the hard coat laminated film was on the surface side. A stainless steel sheet (10 mm length, 10 mm width, 1 mm thickness)

covered with a four-ply gauze (a type 1 medical gauze available from Kawamoto Corporation) was attached to a rubbing finger of the Gakushin-type tester, and the resultant was set so that the sheet face of the stainless steel sheet came into contact with the test piece. A load of 350 g was applied. After 10000 reciprocating rubbings of the first hard coat surface of the test piece under conditions that the moving distance of the rubbing finger was 60 mm and the speed was 1 cycle/sec, the water contact angle on the cotton-wiped portion was measured in accordance with the method in the (iii). In the case where the water contact angle was 100° or more, the operation of additionally carrying out 5000 reciprocating rubbings and then measuring the water contact angle on the cotton-wiped portion in accordance with the method in the (iii) was repeated, and evaluation was performed by using the following criteria.

A: The water contact angle was 100° or more even after 25000 cycles of reciprocation.

B: The water contact angle was 100° or more after 20000 cycles but the water contact angle was less than 100° after 25000 cycles of reciprocation.

C: The water contact angle was 100° or more after 15000 cycles of reciprocation but the water contact angle was less than 100° after 20000 cycles of reciprocation.

D: The water contact angle was 100° or more after 10000 cycles of reciprocation but the water contact angle was less than 100° after 15000 cycles of reciprocation.

E: The water contact angle was less than 100° after 10000 cycles of reciprocation.

(v) Total Light Transmittance

The total light transmittance was measured according to JIS K7361-1:1997 by using a turbidimeter "NDH2000" (trade name) of Nippon Denshoku Industries Co., Ltd.

(vi) Yellowness Index

The yellowness index was measured according to JIS K7105:1981 by using a colorimeter "SolidSpec-3700" (trade name) available from Shimadzu Corporation.

(vii) Cross-Cut Test (Adhesiveness)

In accordance with JIS K5600-5-6:1999, a square lattice pattern cut consisting of 100 cells (1 cell=1 mm×1 mm) was provided on the first hard coat surface of a hard coat laminated film. Thereafter, a tape for adhesion tests was attached on the square lattice pattern cut and rubbed with fingers and then peeled off. The criteria for evaluation were in accordance with Table 1 in the above standard of JIS.

Classification 0: The edges of the cuts were completely smooth; none of the squares of the lattice was detached.

Classification 1: Detachment of small flakes of the coat was seen at the intersections of the cuts. A cross-cut area of not greater than 5% was affected.

Classification 2: The coat flaked along the edges and/or at the intersections of the cuts.

A cross-cut area of greater than 5%, but not greater than 15%, was affected.

Classification 3: The coat flaked along the edges of the cuts partly or wholly in large ribbons, and/or it flaked partly or wholly on different parts of the squares. A cross-cut area of greater than 15%, but not greater than 35%, was affected.

Classification 4: The coat flaked along the edges of the cuts partly or wholly in large ribbons and/or some squares detached partly or wholly. A cross-cut area of greater than 35%, but not greater than 65%, was affected.

Classification 5: This criterion was defined as the case where the degree of flaking was greater than that in Classification 4.

(viii) Minimum Bending Radius

With reference to Bending Formability (B method) in JIS-K6902:2007, a test piece of a hard coat laminated film was conditioned at a temperature of 23° C.±2° C. and a relative humidity of 50±5% for 24 hours, and thereafter the test piece was bent to form a curve at a bending temperature of 23° C.±2° C. at a bending line with a direction perpendicular to the machine direction of the hard coat laminated film so that the first hard coat of the hard coat laminated film was on the outer side, and for the resultant, measurement was performed. The radius of the front face of the shaping jig having the smallest radius of the front face among shaping jigs with no crack generated was defined as the minimum bending radius. The "front face" has the same meaning as the term regarding a shaping jig in the B method defined in Paragraph 18.2 in JIS K6902:2007.

(ix) Cutting Processability (Condition of Curved Cutting-Processed Line)

A hard coat laminated film was provided with a cut hole in true circle with a diameter of 2 mm and a cut hole in true circle with a diameter of 0.5 mm by using a router processing machine automatically controlled with a computer. The mill used then was a four-bladed super-hard-alloy mill with nicks that has a cylindrically round tip, and the blade diameter was appropriately selected depending on a portion to be processed. Subsequently, the cut hole with a diameter of 2 mm was observed for the cut edge surface visually or with a microscope (100×) and evaluation was performed by using the following criteria. Similarly, the cut hole with a diameter of 0.5 mm was observed for the cut edge surface visually or with a microscope (100×) and evaluation was performed by using the following criteria. The result of the former case and the result of the latter case were listed in this order in the tables below.

⊚: (very good): No crack or burr was found even in microscopic observation.

○: (good): No crack was found even in microscopic observation but a burr was found.

Δ: (slightly poor): No crack was found in visual observation but a crack was found in microscopic observation.

x: (poor): A crack was found even in visual observation.

(x) Surface smoothness (surface appearance)

The surface (i.e., each of both surfaces) of a hard coat laminated film was visually observed while irradiating with a fluorescent light from various incident angles, and evaluation was performed by using the following criteria.

⊚ (very good): No undulations or flaws were found on the surface. No cloudiness was perceived even when the surface was seen through with a light irradiated closely.

○ (good): A portion with a little cloudiness was found when the surface was seen through with a light irradiated closely.

Δ (slightly poor): Undulations or flaws were found on the surface in a small quantity when the surface was looked at closely. Further, cloudiness was perceived.

x (poor): Undulations or flaws were found on the surface in a large quantity. Further, cloudiness was clearly perceived.

Raw Materials Used (A) Multifunctional (meth)acrylate:

(A-1) Dipentaerythritol hexaacrylate: a multifunctional acrylate having 6 acryloyl groups in one molecule (A-2) "Viscoat #802" (trade name) available from Osaka Organic Chemical Industry Co., Ltd.: a mixture of 60 mass % of tripentaerythritol acrylate (having 8 or 7 acryloyl groups in one molecule), 15 mass % of dipentaerythritol acrylate (having 6 or 5 acryloyl groups in one molecule), 10 mass % if tetrapentaerythritol acrylate (having 10 or 9 acryloyl groups in one molecule), a polypentaerythritol acrylate (having (2N+2) or (2N+1) acryloyl groups when the number of linkage is N, where N is a natural number of 5 or more) and monopentaerythritol acrylate (having 4 or 3 acryloyl groups in one molecule)

(A-3) Pentaerythritol triacrylate: a multifunctional acrylate having 3 acryloyl groups in one molecule (B) Water repellent (B-1) An acryloyl group-containing fluoropolyether water repellent KY-1203 "(trade name) available from "Shin-Etsu Chemical Co., Ltd.": 20 mass % of solid content (B-2) A methacryloyl group-containing fluoropolyether water repellent "FOMBLIN MT70" (trade name) available from Solvay S.A.: 70 mass % of solid content (C) Silane coupling agent:

(C-1) N-2-(aminoethyl)-3-aminopropylmethyldimethoxysilane "KBM-602" (trade name) available from Shin-Etsu Chemical Co., Ltd.

(d1) Multifunctional (meth)acrylate having three or more (meth)acryloyl groups in one molecule (d1-1) Pentaerythritol triacrylate: a multifunctional acrylate having 3 acryloyl groups in one molecule (d2) Compound having two or more secondary thiol groups in one molecule (d2-1) A compound "Karenz MT NR-1" (trade name) available from Showa Denko KK, which has three secondary thiol groups in one molecule: 1,3,5-tris(3-mercaptobutyryloxyethyl)-1,3,5-triazine-2,4,6(1H, 3H, 5H)-trione (d2-2) A compound "Karenz MT BD-1" (trade name) available from Showa Denko Corporation, which has two secondary thiol groups in one molecule: 1,4-bis (3-mercaptobutyryloxy)butane (d2-3) A compound Kaoruzu MT PE-1 (trade name) available from Showa Denko, which has 4 secondary thiol groups in one molecule: pentaerythritol tetrakis(3-mercaptobutyrate)

(d3) One or more (meth)acrylates selected from the group consisting of a (meth)acrylate having two (meth)acryloyl groups in one molecule, a (meth)acrylate having one (meth)acryloyl group in one molecule, and an urethane (meth)acrylate (d3-1) "Ebecryl 284" (trade name) available from Daicel Ornex Corporation: a mixture of 88 mass % of an aliphatic urethane acrylate having two acryloyl groups in one molecule and 12 mass % of 1,6-hexanediol diacrylate (having two acryloyl groups in one molecule)

(d3-2) "Ebecryl 4100" (trade name) available from Daicel-Ornecs Co., Ltd.: an aliphatic urethane acrylate having three acryloyl groups in one molecule (d3-3) "Ebecryl 4200" (trade name) available from Daicel-Ornecs Co., Ltd.: an aliphatic urethane acrylate having four acryloyl groups in one molecule (d3-4) Urethane acrylate "Art Resin UN-904" (trade name) available from Negami Industrial Co., Ltd.: an urethane acrylate having 10 acryloyl groups in one molecule (d3-5) Tricyclodecanedimethanol diacrylate "A-DCP" (trade name) available from Shin Nakamura Chemical Co., Ltd.: a multifunctional acrylate having two acryloyl groups in one molecule (d3-6) An acrylic acid adduct of tripropylene glycol diglycidyl ether "Epoxy ester 70 PA" (trade name) available from Kyoeisha Chemical Co., Ltd.: a multifunctional acrylate having two acryloyl groups in one molecule (d3-7) An acrylic acid adduct of glycerol diglycidyl ether "Epoxy ester 80 MFA" (trade name) available from Kyoei Chemical Co., Ltd.: a multifunctional acrylate having two acryloyl groups in one molecule (d3-8) 1,6-hexanediol diacrylate: a multifunctional acrylate having two acryloyl groups in one molecule (d3-9) 2-acryloyloxyethyl-succinic acid: a compound having one acryloyl group in one molecule (d3-10) Hydroxyethylacrylamide: a compound having one acryloyl group in one molecule (E) Inorganic fine particles having average particle size of 1 to 300 nm (E-1) Silica fine particles having an average particle size of 20 nm, which have been subjected to a surface treatment with a silane coupling agent having a vinyl group (F) Leveling agent (F-1) A silicone/acrylic copolymer leveling agent "Disparon NSH-8430HF" (trade name) available from Kusumoto Kasei Co., Ltd.: 10 mass % of solid content (G) Optional component (G-1) An acetophenone photopolymerization initiator (1-hydroxy-cyclohexyl-phenyl ketone) "IRGACURE 184" (trade name) available from BASF Co., Ltd.

(G-2) 1-methoxy-2-propanol (H1) Coating material for forming first hard coat (H1-1) A coating material was obtained by mixing and stirring 100 parts by mass of the (A-1), 2 parts by mass (0.40 parts by mass in solid content) of the (B-1), 0.06 parts by mass (0.042 parts by mass in solid content) of the (B-2), 0.5 parts by mass of the (C-1), 4 parts by mass of the (G-1), and 100 parts by mass of the (G-2).

(H1-2) A coating material was obtained by mixing and stirring 100 parts by mass of the (A-2), 2 parts by mass (0.40 parts by mass in solid content) of the (B-1), 0.06 parts by mass (0.042 parts by mass in solid content) of the (B-2), 0.5 parts by mass of the (C-1), 4 parts by mass of the (G-1), and 100 parts by mass of the (G-2).

(H1-3) A coating material was obtained by mixing and stirring 100 parts by mass of the (A-3), 2 parts by mass (0.40 parts by mass in solid content) of the (B-1), 0.06 parts by mass (0.042 parts by mass in solid content) of the (B-2), 0.5 parts by mass of the (C-1), 4 parts by mass of the (G-1), and 100 parts by mass of the (G-2)

(H1-4) A coating material was obtained by mixing and stirring 100 parts by mass of the (A-1), 2 parts by mass (0.40 parts by mass in solid content) of the (B-1), 0.06 parts by mass (0.042 parts by mass in solid content) of the (B-2), 0.5 parts by mass of the (C-1), 20 parts by mass of the (E-1), 4 parts by mass of the (G-1), and 130 parts by mass of the (G-2).

(H2) Coating material for forming second hard coat (H2-1) A coating material was obtained by mixing and stirring 50 parts by mass of the (d1-1), 25 parts by mass of the (d2-1), 25 parts by mass of the (d3-1), 200 parts by mass of the (E-1), 2 parts by mass (0.2 parts by mass in solid content) of the (F-1), 15 parts by mass of the (G-1), and 280 parts by mass of the (G-2). The formulation is shown in Table 1. A solid content is shown for the component (F-1) in the table.

(H2-2 to H2-31) Coating materials were obtained in the same manner as in the (H2-1), except that the formulation of each coating material was changed as shown in any one of Tables 1 to 7. The formulations are shown in any one of Tables 1 to 7. For each formulation, a solid content is shown for the component (F-1) in the table.

Figure 4:
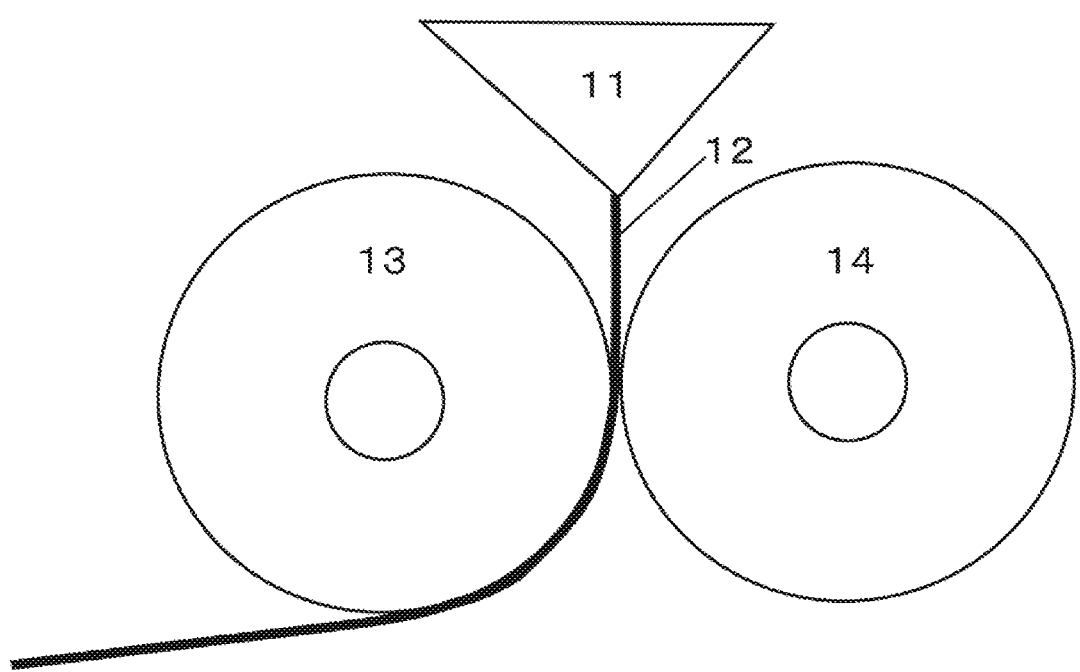
FIG. 4 is a conceptual view illustrating an example of a film forming apparatus.

(P) Transparent resin film (P-1) Using an apparatus (FIG. 4) including a two-component/three-layer multimanifold-type coextrusion T-die 11 and a winder having a mechanism to pressurize a melted film 12 with a first mirror-finished roll 13 (i.e., a roll to hold the melted film 12 and send the melted film to a subsequent transfer roll) and a second mirror-finished roll 14, a two-component/three-layer multilayer resin film in which both outer layers (α1 layer and α2 layer) were formed of the poly(meth)acrylimide "PLEXIMID TT50" (trade name) available from Evonik Industry AG and the intermediate layer (β layer) was formed of an aromatic polycarbonate "CALIBRE 301-4" (trade name) available from Sumika Styron Polycarbonate Limited was continuously coextruded from the coextrusion T-die 11. The coextruded product was then fed between the rotating first mirror-finished roll 13 and the second mirror-finished roll 14 so that the α1 layer was on the first mirror-finished roll 13 side, and pressurized. As a result, a transparent resin film having a total thickness of 250 μm was obtained in which the layer thickness of the α1 layer was 80 μm, the layer thickness of the 13 layer was 90 μm and the layer thickness of the α2 layer was 80 μm. Regarding the conditions set for this operation, the temperature of the T-die, the temperature of the first mirror-finished roll, the temperature of the second mirror-finished roll and the wind-up speed were set to 300° C., 130° C., 120° C. and 6.5 m/min, respectively.

(P-2) A transparent resin film was obtained in the same manner as in the (P-1), except that an acrylic resin containing a structural unit derived from methyl methacrylate in an amount of 76.8 mol % and a structural unit derived from vinylcyclohexane in an amount of 23.2 mol % based on 100 mol % of a sum of the structural units derived from the polymerizable monomers was used instead of "PLEXIMID TT 50" (trade name) as both outer layers.\

Example 1

Both surfaces of the (P-1) were subjected to a corona discharge treatment. Both surfaces had a wetting index of 64 mN/m. Subsequently, the surface on the α1 layer side was coated with the (H2-1) by using a die-type applicator so that the wet coat thickness was 40 μm (thickness after curing: 22 μm). Next, the resultant was passed in a drying furnace with the inner temperature set to 90° C. at a line speed such that the time required to pass through from the inlet to the outlet was 1 minute, and then treated with a curing apparatus (see FIG. 3) having a UV irradiator 7 of high-pressure mercury lamp type and a mirror-finished metal roll 8 having a diameter of 25.4 cm which were disposed opposite to each other, under conditions that the temperature of the mirror-finished metal roll 8 was 90° C. and the integrated amount of light was 80 mJ/cm². As a result, the wet coat formed of the (H2-1) became a coating film in a set-to-touch state. Subsequently, the coating film in a set-to-touch state formed of the (H2-1) was coated with the (H1-1) by using a die-type applicator so that the wet coat thickness was 4 μm (thickness after curing: 2 μm). Next, the resultant was passed in a drying furnace with the inner temperature set to 80° C. at a line speed such that the time required to pass through from the inlet to the outlet was 1 minute, and then treated to form a first hard coat and a second hard coat with a curing apparatus (see FIG. 3) having a UV irradiator 7 of high-pressure mercury lamp type and a mirror-finished metal roll 8 having a diameter of 25.4 cm which were disposed opposite to each other, under conditions that the temperature of the mirror-finished metal roll 8 was 60° C. and the integrated amount of light was 480 mJ/cm². Subsequently, a third hard coat was formed on the surface on the α2 layer side with the same coating material as in forming the second hard coat (e.g., the (H2-1) in Example 1) by using a die-type applicator so that the thickness after curing was the same as that of the second hard coat (e.g., the thickness after curing of 22 μm in Example 1), and as a result a hard coat laminated film was obtained. The tests (i) to (x) were performed for this hard coat laminated film. The results are shown in Table 1.

Examples 2 to 31

Each hard coat laminated film was prepared and measurement/evaluation of the physical properties was performed totally in the same way as in Example 1 except that the formulation shown in one of Tables 1 to 7 was used as the coating material for forming the second hard coat. The results are shown in one of Tables 1 to 7.

Example 32

A hard coat laminated film was prepared and measurement/evaluation of the physical properties was performed totally in the same way as in Example 1 except that the (H1-2) was used as the coating material for forming the first hard coat. The results are shown in Table 7.

Example 33

A hard coat laminated film was prepared and measurement/evaluation of the physical properties was performed totally in the same way as in Example 1 except that the (H1-3) was used as the coating material for forming the first hard coat. The results are shown in Table 7.

Example 34

A hard coat laminated film was prepared and measurement/evaluation of the physical properties was performed totally in the same way as in Example 1 except that the (H1-4) was used as the coating material for forming the first hard coat. The results are shown in Table 7.

Example 35

A hard coat laminated film was prepared and measurement/evaluation of the physical properties was performed totally in the same way as in Example 1 except that the (P-2) was used as the transparent resin film. The results are shown in Table 7.

TABLE 1

|  |  | Ex. 1 | Ex. 2 | Ex. 3 | Ex. 4 | Ex. 5 |
|---|---|---|---|---|---|---|
| Transparent resin film | | P-1 | P-1 | P-1 | P-1 | P-1 |
| First HC coating material | | H1-1 | H1-1 | H1-1 | H1-1 | H1-1 |
| Second HC coating material | | H2-1 | H2-2 | H2-3 | H2-4 | H2-5 |
| Formulation | d1-1 | 50 | 50 | 50 | 50 | 48 |
| of second | d2-1 | 25 | 25 | 25 | 25 | 33 |
| HC coating | d2-2 | | | | | |
| material | d2-3 | | | | | |
| (part by mass) | d3-1 | 25 | | | | |

TABLE 1-continued

|  |  | Ex. 1 | Ex. 2 | Ex. 3 | Ex. 4 | Ex. 5 |
|---|---|---|---|---|---|---|
|  | d3-2 |  | 25 |  |  |  |
|  | d3-3 |  |  | 25 |  |  |
|  | d3-4 |  |  |  | 25 | 19 |
|  | d3-5 |  |  |  |  |  |
|  | d3-6 |  |  |  |  |  |
|  | d3-7 |  |  |  |  |  |
|  | d3-8 |  |  |  |  |  |
|  | d3-9 |  |  |  |  |  |
|  | d3-10 |  |  |  |  |  |
|  | E-1 | 200 | 200 | 200 | 200 | 200 |
|  | F-1 | 0.2 | 0.2 | 0.2 | 0.2 | 0.2 |
|  | G-1 | 15 | 15 | 15 | 15 | 15 |
|  | G-2 | 280 | 280 | 280 | 280 | 280 |
| Evaluation results | Ball drop test cm | 80 | 85 | 65 | 45 | 60 |
|  | Pencil hardness | 4H | 4H | 4H | 3H | 3H |
|  | Water contact angle deg | 116 | 116 | 116 | 116 | 116 |
|  | Abrasion resistance | A | A | A | A | A |
|  | Total light transmittance % | 90.0 | 90.0 | 90.0 | 90.0 | 90.0 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 10 | 10 | 35 | 35 | 35 |
|  | Cutting processability | ◎-◯ | ◎-◯ | ◎-◯ | ◎-◯ | ◎-◯ |
|  | Surface smoothness | ◎ | ◎ | ◎ | ◎ | ◎ |

TABLE 2

|  |  | Ex. 6 | Ex. 7 | Ex. 8 | Ex. 9 | Ex. 10 |
|---|---|---|---|---|---|---|
| Transparent resin film |  | P-1 | P-1 | P-1 | P-1 | P-1 |
| First HC coating material |  | H1-1 | H1-1 | H1-1 | H1-1 | H1-1 |
| Second HC coating material |  | H2-6 | H2-7 | H2-8 | H2-9 | H2-10 |
| Formulation of second HC coating material (part by mass) | d1-1 | 50 | 50 | 50 | 50 | 50 |
|  | d2-1 | 25 | 25 | 25 | 25 | 25 |
|  | d2-2 |  |  |  |  |  |
|  | d2-3 |  |  |  |  |  |
|  | d3-1 |  |  |  |  |  |
|  | d3-2 |  |  |  |  |  |
|  | d3-3 |  |  |  |  |  |
|  | d3-4 |  |  |  |  |  |
|  | d3-5 | 25 |  |  |  |  |
|  | d3-6 |  | 25 |  |  |  |
|  | d3-7 |  |  | 25 |  |  |
|  | d3-8 |  |  |  | 25 |  |
|  | d3-9 |  |  |  |  | 25 |
|  | d3-10 |  |  |  |  |  |
|  | E-1 | 200 | 200 | 200 | 200 | 200 |
|  | F-1 | 0.2 | 0.2 | 0.2 | 0.2 | 0.2 |
|  | G-1 | 15 | 15 | 15 | 15 | 15 |
|  | G-2 | 280 | 280 | 280 | 280 | 280 |
| Evaluation results | Ball drop test cm | 60 | 75 | 70 | 55 | 65 |
|  | Pencil hardness | 4H | 4H | 4H | 4H | 3H |
|  | Water contact angle deg | 116 | 116 | 116 | 116 | 116 |
|  | Abrasion resistance | A | A | A | A | A |
|  | Total light transmittance % | 90.0 | 90.0 | 90.0 | 90.0 | 90.0 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 35 | 35 | 35 | 35 | 35 |
|  | Cutting processability | ◎-◯ | ◎-◯ | ◎-◯ | ◎-◯ | ◎-◯ |
|  | Surface smoothness | ◎ | ◎ | ◎ | ◎ | ◎ |

TABLE 3

|  |  | Ex. 11 | Ex. 12 | Ex. 13 | Ex. 14 | Ex. 15 |
|---|---|---|---|---|---|---|
| Transparent resin film |  | P-1 | P-1 | P-1 | P-1 | P-1 |
| First HC coating material |  | H1-1 | H1-1 | H1-1 | H1-1 | H1-1 |
| Second HC coating material |  | H2-11 | H2-12 | H2-13 | H2-14 | H2-15 |
| Formulation of second HC coating material (part by mass) | d1-1 | 50 | 50 | 50 | 50 |  |
|  | d2-1 | 25 |  |  |  | 50 |
|  | d2-2 |  | 25 |  |  |  |
|  | d2-3 |  |  | 25 | 25 |  |
|  | d3-1 |  | 25 | 25 |  | 50 |
|  | d3-2 |  |  |  |  |  |

TABLE 3-continued

|  |  | Ex. 11 | Ex. 12 | Ex. 13 | Ex. 14 | Ex. 15 |
|---|---|---|---|---|---|---|
|  | d3-3 |  |  |  |  |  |
|  | d3-4 |  |  |  |  |  |
|  | d3-5 |  |  |  | 25 |  |
|  | d3-6 |  |  |  |  |  |
|  | d3-7 |  |  |  |  |  |
|  | d3-8 |  |  |  |  |  |
|  | d3-9 |  |  |  |  |  |
|  | d3-10 | 25 |  |  |  |  |
|  | E-1 | 200 | 200 | 200 | 200 | 200 |
|  | F-1 | 0.2 | 0.2 | 0.2 | 0.2 | 0.2 |
|  | G-1 | 15 | 15 | 15 | 15 | 15 |
|  | G-2 | 280 | 280 | 280 | 280 | 280 |
| Evaluation results | Ball drop test cm | 50 | 80 | 70 | 50 | >120 |
|  | Pencil hardness | 3H | 3H | 3H | 4H | F |
|  | Water contact angle deg | 116 | 116 | 116 | 116 | 116 |
|  | Abrasion resistance | A | A | A | A | A |
|  | Total light transmittance % | 90.0 | 90.0 | 90.0 | 90.0 | 90.0 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 35 | 35 | 35 | 35 | 30 |
|  | Cutting processability | ◎-◯ | ◎-◯ | ◎-◯ | ◎-◯ | ◎-◯ |
|  | Surface smoothness | ◎ | ◎ | ◎ | ◎ | ◎ |

TABLE 4

|  |  | Ex. 16 | Ex. 17 | Ex. 18 | Ex. 19 | Ex. 20 |
|---|---|---|---|---|---|---|
| Transparent resin film |  | P-1 | P-1 | P-1 | P-1 | P-1 |
| First HC coating material |  | H1-1 | H1-1 | H1-1 | H1-1 | H1-1 |
| Second HC coating material |  | H2-16 | H2-17 | H2-18 | H2-19 | H2-20 |
| Formulation of second HC coating material (part by mass) | d1-1 | 25 | 50 | 67 | 50 | 55 |
|  | d2-1 |  |  |  | 50 | 45 |
|  | d2-2 |  |  |  |  |  |
|  | d2-3 |  |  |  |  |  |
|  | d3-1 | 75 | 50 | 33 |  |  |
|  | d3-2 |  |  |  |  |  |
|  | d3-3 |  |  |  |  |  |
|  | d3-4 |  |  |  |  |  |
|  | d3-5 |  |  |  |  |  |
|  | d3-6 |  |  |  |  |  |
|  | d3-7 |  |  |  |  |  |
|  | d3-8 |  |  |  |  |  |
|  | d3-9 |  |  |  |  |  |
|  | d3-10 |  |  |  |  |  |
|  | E-1 | 200 | 200 | 200 | 200 | 200 |
|  | F-1 | 0.2 | 0.2 | 0.2 | 0.2 | 0.2 |
|  | G-1 | 15 | 15 | 15 | 15 | 15 |
|  | G-2 | 280 | 280 | 280 | 280 | 280 |
| Evaluation results | Ball drop test cm | 45 | 35 | 15 | 75 | 50 |
|  | Pencil hardness | 2H | 3H | 4H | 3H | 4H |
|  | Water contact angle deg | 116 | 116 | 116 | 116 | 116 |
|  | Abrasion resistance | A | A | A | A | A |
|  | Total light transmittance % | 90.0 | 90.0 | 90.0 | 90.0 | 90.0 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 35 | 35 | 40 | 35 | 35 |
|  | Cutting processability | ◎-◯ | ◎-◯ | ◎-◯ | ◎-◯ | ◎-◯ |
|  | Surface smoothness | ◎ | ◎ | ◎ | ◎ | ◎ |

TABLE 5

|  |  | Ex. 21 | Ex. 22 | Ex. 23 | Ex. 24 | Ex. 25 |
|---|---|---|---|---|---|---|
| Transparent resin film |  | P-1 | P-1 | P-1 | P-1 | P-1 |
| First HC coating material |  | H1-1 | H1-1 | H1-1 | H1-1 | H1-1 |
| Second HC coating material |  | H2-21 | H2-22 | H2-23 | H2-24 | H2-25 |
| Formulation of second HC coating material (part by mass) | d1-1 | 67 | 83 | 59 | 59 | 56 |
|  | d2-1 | 33 | 17 | 12 | 29 | 33 |
|  | d2-2 |  |  |  |  |  |
|  | d2-3 |  |  |  |  |  |
|  | d3-1 |  |  | 29 | 12 | 11 |
|  | d3-2 |  |  |  |  |  |
|  | d3-3 |  |  |  |  |  |

TABLE 5-continued

|  |  | Ex. 21 | Ex. 22 | Ex. 23 | Ex. 24 | Ex. 25 |
| --- | --- | --- | --- | --- | --- | --- |
|  | d3-4 |  |  |  |  |  |
|  | d3-5 |  |  |  |  |  |
|  | d3-6 |  |  |  |  |  |
|  | d3-7 |  |  |  |  |  |
|  | d3-8 |  |  |  |  |  |
|  | d3-9 |  |  |  |  |  |
|  | d3-10 |  |  |  |  |  |
|  | E-1 | 200 | 200 | 200 | 200 | 200 |
|  | F-1 | 0.2 | 0.2 | 0.2 | 0.2 | 0.2 |
|  | G-1 | 15 | 15 | 15 | 15 | 15 |
|  | G-2 | 280 | 280 | 280 | 280 | 280 |
| Evaluation results | Ball drop test cm | 30 | 15 | 30 | 60 | 65 |
|  | Pencil hardness | 4H | 5H | 4H | 4H | 4H |
|  | Water contact angle deg | 116 | 116 | 116 | 116 | 116 |
|  | Abrasion resistance | A | A | A | A | A |
|  | Total light transmittance % | 90.0 | 90.0 | 90.0 | 90.0 | 90.0 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 35 | 40 | 35 | 35 | 35 |
|  | Cutting processability | ◎-○ | ◎-○ | ◎-○ | ◎-○ | ◎-○ |
|  | Surface smoothness | ◎ | ◎ | ◎ | ◎ | ◎ |

TABLE 6

|  |  | Ex. 26 | Ex. 27 | Ex. 28 | Ex. 29 | Ex. 30 |
| --- | --- | --- | --- | --- | --- | --- |
| Transparent resin film |  | P-1 | P-1 | P-1 | P-1 | P-1 |
| First HC coating material |  | H1-1 | H1-1 | H1-1 | H1-1 | H1-1 |
| Second HC coating material |  | H2-26 | H2-27 | H2-28 | H2-29 | H2-30 |
| Formulation of second HC coating material (part by mass) | d1-1 | 40 | 45 | 100 | 50 | 50 |
|  | d2-1 | 20 | 9 |  | 25 | 25 |
|  | d2-2 |  |  |  |  |  |
|  | d2-3 |  |  |  |  |  |
|  | d3-1 | 40 | 45 |  | 25 | 25 |
|  | d3-2 |  |  |  |  |  |
|  | d3-3 |  |  |  |  |  |
|  | d3-4 |  |  |  |  |  |
|  | d3-5 |  |  |  |  |  |
|  | d3-6 |  |  |  |  |  |
|  | d3-7 |  |  |  |  |  |
|  | d3-8 |  |  |  |  |  |
|  | d3-9 |  |  |  |  |  |
|  | d3-10 |  |  |  |  |  |
|  | E-1 | 200 | 200 | 200 | 80 | 30 |
|  | F-1 | 0.2 | 0.2 | 0.2 | 0.2 | 0.2 |
|  | G-1 | 15 | 15 | 15 | 15 | 15 |
|  | G-2 | 280 | 280 | 280 | 170 | 130 |
| Evaluation results | Ball drop test cm | 120 | 65 | 10 | 80 | 80 |
|  | Pencil hardness | 3H | 4H | 7H | 3H | H |
|  | Water contact angle deg | 116 | 116 | 116 | 116 | 116 |
|  | Abrasion resistance | A | A | A | A | A |
|  | Total light transmittance % | 90.0 | 90.0 | 90.0 | 91.1 | 91.4 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 30 | 35 | 40 | 30 | 25 |
|  | Cutting processability | ◎-○ | ◎-○ | ◎-○ | ◎-○ | ◎-○ |
|  | Surface smoothness | ◎ | ◎ | ◎ | ◎ | ◎ |

TABLE 7

|  |  | Ex. 31 | Ex. 32 | Ex. 33 | Ex. 34 | Ex. 35 |
| --- | --- | --- | --- | --- | --- | --- |
| Transparent resin film |  | P-1 | P-1 | P-1 | P-1 | P-2 |
| First HC coating material |  | H1-1 | H1-2 | H1-3 | H1-4 | H1-1 |
| Second HC coating material |  | H2-31 | H2-1 | H2-1 | H2-1 | H2-1 |
| Formulation of second HC coating material (part by mass) | d1-1 | 50 | 50 | 50 | 50 | 50 |
|  | d2-1 | 25 | 25 | 25 | 25 | 25 |
|  | d2-2 |  |  |  |  |  |
|  | d2-3 |  |  |  |  |  |
|  | d3-1 | 25 | 25 | 25 | 25 | 25 |
|  | d3-2 |  |  |  |  |  |
|  | d3-3 |  |  |  |  |  |
|  | d3-4 |  |  |  |  |  |

TABLE 7-continued

|  |  | Ex. 31 | Ex. 32 | Ex. 33 | Ex. 34 | Ex. 35 |
|---|---|---|---|---|---|---|
|  | d3-5 |  |  |  |  |  |
|  | d3-6 |  |  |  |  |  |
|  | d3-7 |  |  |  |  |  |
|  | d3-8 |  |  |  |  |  |
|  | d3-9 |  |  |  |  |  |
|  | d3-10 |  |  |  |  |  |
|  | E-1 |  | 200 | 200 | 200 | 200 |
|  | F-1 | 0.2 | 0.2 | 0.2 | 0.2 | 0.2 |
|  | G-1 | 15 | 15 | 15 | 15 | 15 |
|  | G-2 | 105 | 280 | 280 | 280 | 280 |
| Evaluation results | Ball drop test cm | 80 | 80 | 80 | 40 | 80 |
|  | Pencil hardness | F | 5H | 3H | 5H | 4H |
|  | Water contact angle deg | 116 | 116 | 116 | 116 | 116 |
|  | Abrasion resistance | A | A | A | E | A |
|  | Total light transmittance % | 91.8 | 90.0 | 90.0 | 89.8 | 90.0 |
|  | Yellowness index | 0.3 | 0.3 | 0.3 | 0.3 | 0.3 |
|  | Cross-cut test | Class O | Class O | Class O | Class O | Class O |
|  | Minimum bending radius mm | 20 | 45 | 30 | 40 | 35 |
|  | Cutting processability | ◎-◎ | ◎-◎ | ◎-◎ | ◎-◎ | ◎-◎ |
|  | Surface smoothness | ◎ | ◎ | ◎ | ◎ | ◎ |

It was found from these results that the hard coat laminated film according to various embodiments was excellent in ball drop impact resistance in the preferable hard coat film formulation. Further, it was found that the preferable hard coat laminated film according to at least one embodiment was excellent in ball drop impact resistance, surface hardness, abrasion resistance, transparency, color tone, interlayer adhesion strength, bending resistance, cutting processability, and surface appearance. Therefore, the hard coat laminated film according to at least one embodiment can be suitably used as a member of an image display device such as a liquid crystal display, a plasma display, and an electroluminescence display (including an image display device having a touch panel function and an image display device not having a touch panel function), particularly a display faceplate for a smartphone or a tablet terminal.

REFERENCE SIGNS LIST

1 First hard coat
2 Second hard coat
3 First poly(meth)acrylimide resin layer (α1)
4 Aromatic polycarbonate resin layer (β)
5 Second poly(meth)acrylimide resin layer (α2)
6 Third hard coat
7 Ultraviolet irradiator
8 Mirror-finished metal roll
9 Web
10 Holding angle
11 Coextrusion T die
12 Molten film
13 First mirror-finished roll
14 Second mirror-finished roll

The invention claimed is:

1. A hard coat laminated film comprising a first hard coat, a second hard coat, and a transparent resin film layer in this order from a surface layer side,
   wherein the first hard coat comprises:
      (A) 100 parts by mass of a multifunctional (meth) acrylate;
      (B) 0.01 to 7 parts by mass of a water repellent; and
      (C) 0.01 to 10 parts by mass of a silane coupling agent, and
   the first hard coat is formed from a coating material not containing inorganic particles,
   the second hard coat is formed from a coating material comprising:
      (D) 100 parts by mass of a polymerizable compound; and
      (E) 50 to 300 parts by mass of inorganic fine particles having an average particle size of 1 to 300 nm, and
   the (D) polymerizable compound comprises:
      (d1) a multifunctional (meth)acrylate having three or more (meth)acryloyl groups in one molecule;
      (d2) a compound having two or more secondary thiol groups in one molecule; and
      optionally, (d3) one or more (meth)acrylates selected from the group consisting of a (meth)acrylate having two (meth)acryloyl groups in one molecule, a (meth) acrylate having one (meth)acryloyl group in one molecule, and an urethane (meth)acrylate.

2. The hard coat laminated film according to claim 1, wherein the (D) polymerizable compound is composed of 60 to 30 mass % of the component (d1), 5 to 70 mass % of the component (d2), and 0 to 50 mass % of the component (d3), provided that the sum of the components (d1), (d2), and (d3) is 100 mass %.

3. The hard coat laminated film according to claim 1 or 2, wherein the component (d2) comprises a compound having two or three secondary thiol groups in one molecule.

4. The hard coat laminated film according to claim 2, wherein the amount of the component (d3) in the (D) polymerizable compound is 5 to 50 mass %.

5. The hard coat laminated film according to claim 2, wherein the component (d2) comprises a compound having two or three secondary thiol groups in one molecule, and the amount of the component (d3) in the (D) polymerizable compound is 5 to 50 mass %.

6. The hard coat laminated film according to claim 4 or 5, wherein the component (d3) comprises an aliphatic urethane (meth)acrylate having two (meth)acryloyl groups in one molecule.

7. The hard coat laminated film according to claim 4 or 5, wherein the component (d3) comprises tricyclodecanedimethanol di(meth)acrylate.

8. The hard coat laminated film according to claim 4 or 5, wherein the component (d3) comprises a compound having a structure represented by the following general formula:

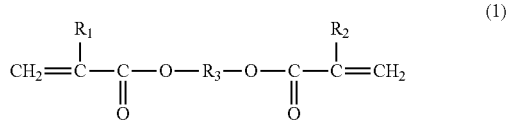

(1)

wherein $R_1$ and $R_2$ are each independently a hydrogen atom or a methyl group, and $R_3$ is an aliphatic alkylene group which may have a branched alkyl group, a cyclic hydrocarbon group, an ether group, or a hydroxyl group as a substituent or in the backbone.

9. The hard coat laminated film according to claim 8, wherein $R_3$ in the formula (1) contains a bridged cyclic hydrocarbon group.

10. The hard coat laminated film according to claim 8, wherein $R_3$ in the formula (1) is $-(CH_2)_n-$ wherein n is a natural number of 2 or more.

11. An image display device comprising the hard coat laminated film according to claim 1.

12. An article comprising the hard coat laminated film according to claim 1.

13. A hard coat laminated film comprising a first hard coat, a second hard coat, and a transparent resin film layer in this order from a surface layer side,
   wherein the first hard coat is formed from a coating material comprising:
   (A) a multifunctional (meth)acrylate;
   (B) a water repellent; and
   (C) a silane coupling agent,
   and not containing inorganic particles, and
   wherein the second hard coat is formed from a coating material comprising:
   (d1) a multifunctional (meth)acrylate having three or more (meth)acryloyl groups in one molecule;
   (d2) a compound having two or more secondary thiol groups in one molecule; and
   (E) inorganic fine particles having an average particle size of 1 to 300 nm, and
   wherein the following characteristics (i) and (ii) are satisfied:
   (i) when a surface opposite to a first hard coat surface of the hard coat laminated film is bonded to a float plate glass, a steel ball with a mass of 110 g is let fall freely on the first hard coat surface from a height of 30 cm, and visual observation is performed from the first hard coat surface side, no trace of impact by the steel ball is recognized; and
   (ii) a pencil hardness of the first hard coat surface measured according to JIS K(5600-5-4:1999 except that a load is 1 kg is 3H or more.

14. The hard coat laminated film according to claim 13, wherein the second hard coat is formed from a coating material comprising:
   (d1) the multifunctional (meth)acrylate having three or more (meth)acryloyl groups in one molecule;
   (d2) the compound having two or more secondary thiol groups in one molecule;
   (d3) one or more (meth)acrylates selected from the group consisting of a (meth)acrylate having two (meth)acryloyl groups in one molecule, a (meth)acrylate having one (meth)acryloyl group in one molecule, and an urethane (meth)acrylate; and
   (E) the inorganic fine particles having an average particle size of 1 to 300 nm.

15. The hard coat laminated film according to claim 14, wherein the component (d3) comprises an aliphatic urethane (meth)acrylate having two (meth)acryloyl groups in one molecule.

16. The hard coat laminated film according to claim 14, wherein the component (d3) comprises tricyclodecanedimethanol di(meth)acrylate.

17. The hard coat laminated film according to claim 14, wherein the component (d3) comprises a compound having a structure represented by the following general formula:

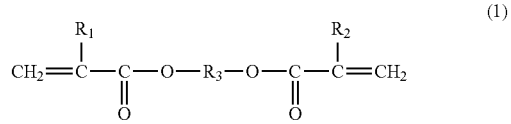

(1)

wherein $R_1$ and $R_2$ are each independently a hydrogen atom or a methyl group, and $R_3$ is an aliphatic alkylene group which may have a branched alkyl group, a cyclic hydrocarbon group, an ether group, or a hydroxyl group as a substituent or in the backbone.

18. The hard coat laminated film according to claim 17, wherein $R_3$ in the formula (1) contains a bridged cyclic hydrocarbon group.

19. The hard coat laminated film according to claim 18, wherein $R_3$ in the formula (1) is $-(CH_2)_n-$ wherein n is a natural number of 2 or more.

20. The hard coat laminated film according to claim 13 or 14, wherein the following characteristics (iii) and (iv) are further satisfied:
   (iii) a water contact angle of the first hard coat surface is 100° or more; and
   (iv) a water contact angle after reciprocally wiping the first hard coat surface with a cotton 20,000 times is 100° or more.

* * * * *